(12) United States Patent
Ozcan et al.

(10) Patent No.: US 11,170,306 B2
(45) Date of Patent: Nov. 9, 2021

(54) RICH ENTITIES FOR KNOWLEDGE BASES

(71) Applicant: International Business Machines Corporation, Armonk, NY (US)

(72) Inventors: Fatma Ozcan, San Jose, CA (US); Abdul H. Quamar, San Jose, CA (US); Konstantinos Xirogiannopoulos, College Park, MD (US)

(73) Assignee: International Business Machines Corporation, Armonk, NY (US)

( * ) Notice: Subject to any disclaimer, the term of this patent is extended or adjusted under 35 U.S.C. 154(b) by 1165 days.

(21) Appl. No.: 15/449,802

(22) Filed: Mar. 3, 2017

(65) Prior Publication Data
US 2018/0253653 A1 Sep. 6, 2018

(51) Int. Cl.
*G06N 5/02* (2006.01)
*G06N 20/00* (2019.01)
*G06F 16/36* (2019.01)

(52) U.S. Cl.
CPC .......... *G06N 5/022* (2013.01); *G06F 16/367* (2019.01); *G06N 20/00* (2019.01)

(58) Field of Classification Search
None
See application file for complete search history.

(56) References Cited

U.S. PATENT DOCUMENTS

| 2010/0131563 | A1* | 5/2010 | Yin | ...... G06F 16/355 707/794 |
| 2010/0318558 | A1* | 12/2010 | Boothroyd | ...... G06F 16/951 707/769 |
| 2016/0019228 | A1* | 1/2016 | Hong | ...... G06F 16/9024 707/624 |

OTHER PUBLICATIONS

Boldi, Paolo, Massimo Santini, and Sebastiano Vigna. "PageRank as a function of the damping factor." Proceedings of the 14th international conference on World Wide Web. 2005. (Year: 2005).*
Butt, Anila Sahar, Armin Haller, and Lexing Xie. "RecoOn: Ontology recommendation for structureless queries." Applied Ontology 11.4 (2016): 301-324. (Year: 2016).*
Motik, Boris, et al. "OWL 2 web ontology language: Structural specification and functional-style syntax." W3C recommendation 27.65 (2009): 159. (Year: 2009).*
Avrachenkov, Konstantin, et al. "Pagerank based clustering of hypertext document collections." Proceedings of the 31st annual international ACM SIGIR conference on Research and development in information retrieval. 2008. (Year: 2008).*

(Continued)

*Primary Examiner* — Daniel T Pellett
(74) *Attorney, Agent, or Firm* — Zilka-Kotab, P.C.

(57) ABSTRACT

According to one embodiment, a computer program product includes a computer readable storage medium having program instructions embodied therewith. The program instructions are executable by a processor to cause the processor to: identify key concepts in a domain ontology, and define a workload as a set of queries. Terms are extracted from each of the queries, and frequent patterns are detected across the set of queries. Maximal patterns are also identified from the frequent patterns detected, while the key concepts and the maximal patterns are used to create a rich entity. Moreover, identifying the key concepts includes performing centrality analysis of concepts extracted from the domain ontology. Other systems, methods, and computer program products are described in additional embodiments.

23 Claims, 22 Drawing Sheets

(56) References Cited

OTHER PUBLICATIONS

Wang, Haixun, et al. "Clustering by pattern similarity in large data sets." Proceedings of the 2002 ACM SIGMOD international conference on Management of data. 2002. (Year: 2002).*

Euzenat, Jérôme, Axel Polleres, and François Scharffe. "Processing ontology alignments with SPARQL." 2008 International Conference on Complex, Intelligent and Software Intensive Systems. IEEE, 2008. (Year: 2008).*

Wen et al., "Query Clustering Using User Logs," ACM Transactions on Information Systems, vol. 20, No. 1, Jan. 2002, pp. 59-81.

Agrawal et al., "Fast Algorithms for Mining Association Rules," Proceedings of the 20th VLDB Conference, 1994, pp. 1-13.

Alani et al., "Ontology Ranking based on the Analysis of Concept Structures," K-CAP '05, Oct. 2-5, 2005, pp. 51-58.

Bayardo, R., "Efficiently Mining Long Patterns from Databases," SIGMOD '98, 1998, pp. 85-93.

Beeferman et al., "Agglomerative clustering of a search engine query log," KDD 2000, 2000, pp. 407-416.

Boldi et al., "Query Suggestions Using Query-Flow Graphs," WSCD '09, Feb. 9, 2009, pp. 1-8.

Brandes, U., "A Faster Algorithm for Betweenness Centrality," Journal of Mathematical Sociology, vol. 25, No. 2, 2001, pp. 1-15.

Brin et al., "Dynamic Itemset Counting and Implication Rules for Market Basket Data," SIGMOD '97, 1997, pp. 255-264.

Burdick et al., "MAFIA: A Maximal Frequent Itemset Algorithm for Transactional Databases," Proceedings of the 17th International Conference on Data Engineering, 2001, pp. 1-10.

Cafarella et al., "KnowItNow: Fast, Scalable Information Extraction from the Web," Proceedings of Human Language Technology Conference and Conference on Empirical Methods in Natural Language Processing, Oct. 2005, pp. 563-570.

Cheung et al., "Maintenance of Discovered Association Rules in Large Databases: An Incremental Updating Technique," Proceedings of the Twelfth International Conference on Data Engineering, Feb. 26-Mar. 1, 1996, pp. 1-9.

Ding et al., "Swoogle: A Search and Metadata Engine for the Semantic Web," CIKM '04, Nov. 8-13, 2004, pp. 652-659.

Etzioni et al., "WebScale Information Extraction in KnowItAll (Preliminary Results)," WWW2004, May 17-22, 2004, pp. 100-110.

Fellbaum, C. "WordNet: an electronic lexical database," MIT Press, 1998, pp. 1-7.

Fogaras, D., "Where to Start Browsing the Web?" Springer Berlin, 2003, pp. 1-15.

Gouda et al., "Efficiently Mining Maximal Frequent Itemsets," Data Mining and Knowledge Discovery, vol. 11, No. 3, Nov. 2005, pp. 1-8.

Gruber, T., "A Translation Approach to Portable Ontology Specifications," Knowledge Acquisition, vol. 5, No. 2, Apr. 1993, pp. 1-27.

Han et al., "Mining Frequent Patterns without Candidate Generation," SIGMOD 2000, May 2000, pp. 1-12.

Kleinberg, J., "Authoritative Sources in a Hyperlinked Environment," Journal of the ACM, vol. 46, No. 5, Sep. 1999, pp. 604-632.

Konishi et al., "Extracting Search Query Patterns via the Pairwise Coupled Topic Model," WSDM '16, Feb. 22-25, 2016, pp. 655-664.

Meng et al., "MLlib: Machine Learning in Apache Spark," Journal of Machine Learning Research, vol. 17, Apr. 2016, pp. 1-7.

W3C OWL Working Group, "OWL 2 Web Ontology Language: Document Overview," W3C Recommendation, Oct. 27, 2009, pp. 1-7.

Page et al., "The PageRank Citation Ranking: Bringing Order to the Web," Technical Report, Jan. 29, 1998, pp. 1-17.

Patel et al., "OntoKhoj: A Semantic Web Portal for Ontology Searching, Ranking and Classification," WIDM'03, Nov. 7-8, 2003, pp. 58-61.

Rada et al., "Development and Application of a Metric on Semantic Nets," IEEE Transactions on Systems, Man and Cybernetics, vol. 19, Jan./Feb. 1989, pp. 17-30.

Resnik P., "Semantic Similarity in a Taxonomy: An information-based measure and its Application to Problems of Ambiguity in Natural Language," Journal of Artificial Intelligence Research, vol. 11, Jul. 1999, pp. 95-130.

Saha et al., "ATHENA: An OntologyDriven System for Natural Language Querying over Relational Data Stores," Proceedings of the VLDB Endowment, vol. 9, No. 12, 2016, pp. 1209-1220.

Suchanek et al., "YAGO: A Core of Semantic Knowledge Unifying WordNet and Wikipedia," WWW 2007/Track: Semantic Web, May 8-12, 2007, pp. 697-706.

Toivonen, H., "Sampling Large Databases for Association Rules," Proceedings of the 22nd VLDB Conference, 1996, pp. 134-145.

Wen et al., "Clustering User Queries of a Search Engine," WWW10, May 1-5, 2001, pp. 162-168.

Yang, G., "The Complexity of Mining Maximal Frequent Itemsets and Maximal Frequent Patterns," KDD'04, Research Track Paper, Aug. 22.25, 2004, pp. 344-353.

Zaki, M., "Scalable Algorithms for Association Mining," IEEE Transactions on Knowledge and Data Engineering, vol. 12, No. 3, May 2000, pp. 1-38.

Wu et al., "Identifying Potentially Important Concepts and Relations in an Ontology," 7th International Semantic Web Conference, Oct. 26-30, 2008, pp. 33-49.

\* cited by examiner

Algorithm 1: Ontology Page Rank (OntologyPR) Algorithm

Input : Ontology Graph $OG = (V, E)$ where $V$ represents the set of concepts in the ontology, represented as nodes and $E$ represents the set of ObjectProperties, represented as edges between nodes.

Output: $OG = (V, E)$ where each $v \in V$ is updated with an ontology page rank value.

```
//Modify graph structure
for each (v ∈ V) do
    if (v == instanceOf(union)) then
        for each (e ∈ E where (e_d == v)||(e_s == v)) do
            R_e = replicate(e)
            For each replicated incoming( or outgoing) edge
            e'' ∈ R_e, change e''_d (or e''_s) to union member
            nodes
        end
        OG.remove(v)
    end
end
IE = φ
for each (e ∈ E) do
    if (e.Type == is-A) then
        IE = IE ∪ e
        OG.remove(e)
    end
    else
        //add an edge in the reverse direction.
        OG.add(e')
    end
end
//run standard page rank on the modified graph
PageRank(OG)
//Add the inheritance edges back to the ontology graph
for each(ie ∈ IE) do
    OG.add(ie)
end
//update the page rank values
for each v ∈ V do
    updatePR(v)
end
return OG
```

FIG. 8

Algorithm 2: Top K First Derivative PageRank Algorithm.

Input: List of ordered pairs $L_{PR} = \{(n_1, PR_{n_1}), (n_2, PR_{n_2}), ......, (n_N, PR_{n_N})\}$, where each pair represents a node and its page rank in the ontology graph

Input: SD factor $SDF$

Output: List of top k selected nodes $\{n_1, n_2, ..., n_k\}$

//Sort $L_{PR}$ based on the PageRank values in descending order
SortDesc($L_{PR}$)
//create an empty vector of the size $|L_{PR}|$
$size \leftarrow |L_{PR}|$
$Diff_{PR}$ = new List < Double > ($size$)
//Compute the difference vector
for $i = 1, 2, 3, ..., (size - 1)$ do
    | $Diff_{PR}[i-1] = L_{PR}[i-1][1] - L_{PR}[i][1]$
end
$mean = computeMean(Diff_{PR})$
$SD = computeSD(Diff_{PR})$
$foundGap \leftarrow false$
$iteration \leftarrow 0$
TopK=new List<Integer>()
while $foundGap == false$ do
    $iteration \leftarrow iteration + 1$
    for $j = 1, 2, ...,(size - 1)$ do
        $tmpValue = L_{PR}[i-1][1] - L_{PR}[i][1]$
        if $foundGap==false$ then
            | $TopK.add(L_{PR}[i-1][0])$
        end
        if
        $tmpValue > (mean + ((SDF * SD)/iteration))$
        then
            | $foundGap \leftarrow true$
            | break
        end
    end
end
return $TopK$

FIG. 9

Algorithm 3: Top K Direct PageRank Algorithm.

Input: List of ordered pairs $L_{PR} = \{(n_1, PR_{n_1}), (n_2, PR_{n_2}), \ldots, (n_N, PR_{n_N})\}$, where each pair represents a node and its page rank in the ontology graph

Input: SD factor $SDF$

Output: List of top k selected nodes $\{n_1, n_2, \ldots, n_k\}$

//Sort $L_{PR}$ based on the PageRank values in descending order
SortDesc($L_{PR}$)
//create an empty Page Rank vector of the size $|L_{PR}|$
$size \leftarrow |L_{PR}|$
$PR$ = new List < Double > ($size$)
//Extract the Page Rank values from $L_{PR}$
for $i = 0, 2, 3, \ldots, (size - 1)$ do
   | $PR[i] = L_{PR}[i][1]$
end
$mean = computeMean(PR)$
$SD = computeSD(PR)$
$foundGap \leftarrow false$
$iteration \leftarrow 0$
TopK=new List<Integer>()
while $foundGap == false$ do
   if $L_{PR}[iteration][1] >= (mean + SDF * SD)$ then
      | $TopK.add(L_{PR}[iteration][0])$
   end
   else
      | $foundGap \leftarrow true$
   end
   $iteration \leftarrow iteration + 1$
end
return $TopK$

FIG. 10

Algorithm 4: Identify Maximal Patterns

Input : List of Frequent Item Sets
$L_{FI} = \{FI_1, FI_2, ..., FI_n\}$ generated by the FP mining algorithm.

Output: Set of maximal patterns
$L_{MP} = \{MP_1, MP_2, ..., MP_m\}$ where each Maximal Pattern $MP_i = \{T_1, T_2, ..., T_k\}$ $L_{MP} = \phi$ //Sort the Frequent Item Sets by their size.
Sort($L_{FI}$)

//Init the maximal pattern set with the largest frequent pattern
$L_{MP} = L_{MP} \bigcup L_{FI}[0]$
for $i = 1, 2, ..., n$ do
    boolean isMaximal = true
    for $j = 0, 1, ...|L_{MP}|$ do
        if $|L_{FI}[i] \bigcap L_{MP}[j]| == |L_{FI}|$ then
            $isMaximal = false$
            break
        end
    end
    if (isMaximal) then
        $L_{MP} = L_{MP} \bigcup L_{FI}[i]$
    end
end
return $L_{MP}$

FIG. 11

Algorithm 5: Using workload only to create rich entities

Input: Set of maximal patterns
$L_{MP} = \{MP_1, MP_2, ..., MP_n\}$ generated by the Maximal pattern algorithm.

Output: Map of rich entities
$RE = \{kc \to S_{MP} | kc \in C, S_{MP} \subseteq L_{MP}\}$ where $kc$ is the key concept, $C$ is the set of concepts across all maximal patterns in $L_{MP}$ and $S_{MP}$ is the set of maximal patterns clustered around $kc$ $RE = \phi$
// Compute the support for all predicated terms across all Maximal Patterns
$Support_{Map} = \{c \to sp | c \in C, sp \in \mathcal{Z}\}$
for each $(mp \in L_{MP})$ do
    for each $(t \in mp)$ do
        if $(t.Term\_Type ==' Context')$ then
            if $(Support_{Map}.containsKey(t.Concept))$
            then
                $currSp = Support_{Map}.get(t.Concept)$
                $Support_{Map}.put(t.Concept, currSp + 1)$
            end
            else
                $Support_{Map}.put(t.Concept, 1)$
            end
        end
    end
end

// Clusters the maximal patterns around the key concepts
for each $mp \in L_{MP}$ do
    $keyConcept = getConceptWithHighestSp(mp)$
    if $(RE.containsKey(keyConcept))$ then
        $RE.get(keyConcept).add(mp)$
    end
    else
        $S_{MP} = \phi$
        $S_{MP} = S_{MP} \cup mp$
        $RE = RE \leftarrow (keyConcept, S_{MP})$
    end
end
return $RE$

FIG. 13

Algorithm 6: Highest Page Rank Algorithm

Input : Set of maximal patterns
$L_{MP} = \{MP_1, MP_2, ..., MP_n\}$ generated by the Maximal pattern algorithm.

Input : Ontology property Graph $OG = (V, E)$

Output: Map of rich entities
$RE = \{kc \rightarrow S_{MP} | kc \in C, S_{MP} \subseteq L_{MP}\}$ where $kc$ is the key concept, $C$ is the set of concepts across all maximal patterns in $L_{MP}$ and $S_{MP}$ is the set of maximal patterns clustered around $kc$ $RE = \phi$ // Clusters the maximal patterns around the key concepts for each $mp \in L_{MP}$ do
    $keyConcept = getConceptWithHighestPR(mp)$
    if $(RE.containsKey(keyConcept))$ then
        $RE.get(keyConcept).add(mp)$
    end
    else
        $S_{MP} = \phi$
        $S_{MP} = S_{MP} \cup mp$
        $RE = RE \leftarrow (keyConcept, S_{MP})$
    end
end
return $RE$

FIG. 14

Algorithm 7: Top Key Concept Page Rank Algorithm

Input : Set of maximal patterns
$L_{MP} = \{MP_1, MP_2, ...., MP_n\}$ generated by the Maximal pattern algorithm.

Input : Top K key concepts identified using OntologyPR algorithm $TopK_{KC} = \{KC_1, KC_2, ....KC_k\}$

Output: Map of rich entities
$RE = \{kc \rightarrow S_{MP} | kc \in C, S_{MP} \subseteq L_{MP}\}$ where $kc$ is the key concept, $C$ is the set of concepts across all maximal patterns in $L_{MP}$ and $S_{MP}$ is the set of maximal patterns clustered around $kc$ $RE = \phi$ // Clusters the maximal patterns around the key concepts
for each $mp \in L_{MP}$ do
    // Get the set of concepts in mp
    $C_{mp} = \text{getConcepts}(mp)$ // Get the key concepts in the maximal pattern
    $KC_{mp} = C_{mp} \cap TopK_{KC}$
    for each $(kc \in KC_{mp})$ do
        if $(RE.containsKey(kc))$ then
            $RE.get(kc).add(mp)$
        end
        else
            $S_{MP} = \phi$
            $S_{MP} = S_{MP} \cup mp$
            $RE = RE \leftarrow (kc, S_{MP})$
        end
    end
end
return $RE$

FIG. 15

Algorithm 8: Pattern Merge Algorithm

Input: Map of rich entities
$RE = \{kc \to S_{MP} | kc \in C, S_{MP} \subseteq L_{MP}\}$ where $kc$ is the key concept, $C$ is the set of concepts across all maximal patterns in $L_{MP}$ and $S_{MP}$ is the set of maximal patterns clustered around $kc$

Output: Map of Merged rich entities
$RE_M = \{kc \to MS_{MP} | kc \in C\}$ where $kc$ is the key concept, $C$ is the set of concepts across all maximal patterns in $L_{MP}$ and $MS_{MP}$ is the set of merged maximal patterns clustered around $kc$ $RE_M = \phi$
for each $((kc, S_{MP}) \in RE)$ do
    $MS_{MP} = \phi$
    add = false
    for each $mp \in S_{MP}$ do
        $add = MergePattern(mp, MS_{MP})$
        if *(add)* then
            $MS_{MP} = MS_{MP} \bigcup mp$
        end
    end
    $RE_M = RE_M \bigcup (kc, MS_{MP})$
end
return $RE_M$

FIG. 17

Merging would result into two separate patterns for the rich entity.

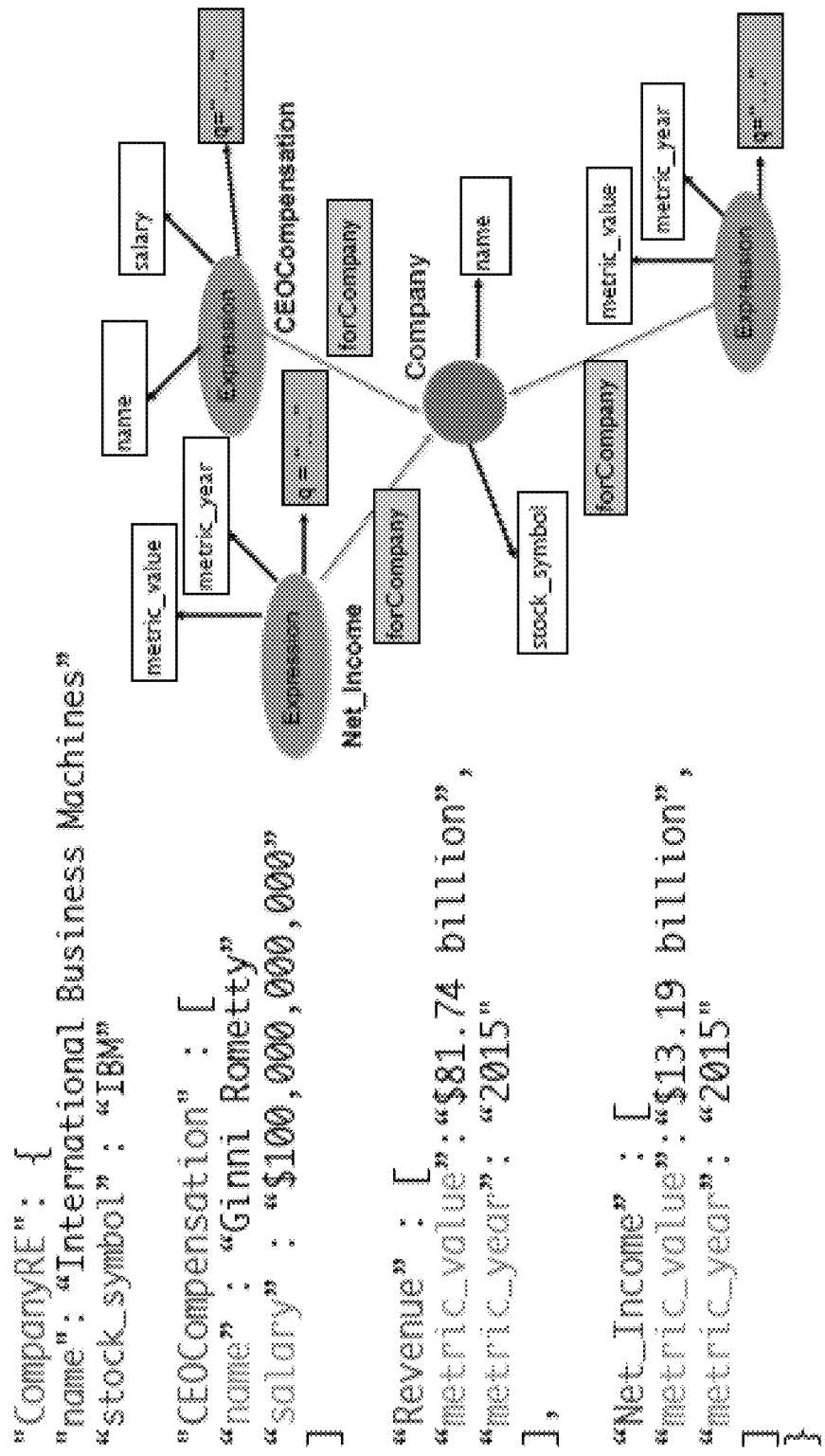

RICH ENTITIES FOR KNOWLEDGE BASES

BACKGROUND

The present invention relates to data storage, and more specifically, this invention relates to improved data storage organization and availability of data relevant to requests.

Businesses and professional organizations from a variety of different domains such as finance, weather, healthcare, social networks, sensor networks (e.g., the internet of things), scientific data, etc., produce massive amounts of unstructured, semi-structured and structured data. Conventional knowledge bases provide a mechanism which is able to store, index and query vast amounts of integrated content that has been derived from these data sources. To provide some structure to the data collected from a variety of sources, these conventional knowledge bases are often associated with domain specific metadata called taxonomies, simple glossaries (or dictionaries) and ontologies that together help provide more sophisticated semantics to the integrated data. In particular, many conventional knowledge bases use domain-specific ontologies to provide an entity-centric view over the integrated content stored in these knowledge bases. These entity-centric views enable querying individual real-world entities, as well as exploring exact information (e.g., such as address or net revenue of a company) through explicit querying using languages such as Structured Query Language (SQL) or SPARQL Protocol and RDF Query Language (SPARQL).

Although useful for many business and commercial applications, these conventional implementations are not sufficient for the exploration of relevant and context specific information associated with real-world entities stored in these knowledge bases. Users often resort to a tedious manual process of discovering the knowledge base and issuing countless queries to gather the information they desire about a real-world entity. For example, depending on the number of different facts about a given company a user desires, the user may have to construct and issue a corresponding number of ad-hoc queries to the knowledge base. Accordingly, the organization and availability of data in conventional knowledge bases is not suitable.

SUMMARY

A computer program product, according to one embodiment, includes a computer readable storage medium having program instructions embodied therewith, the program instructions executable by a processor to cause the processor to: identify, by the processor, key concepts in a domain ontology, and use, by the processor, the key concepts to create a rich entity. Identifying the key concepts includes performing centrality analysis of concepts extracted from the domain ontology.

A computer program product, according to another embodiment, includes a computer readable storage medium having program instructions embodied therewith, the program instructions executable by a processor to cause the processor to: define, by the processor, a workload as a set of queries, extract, by the processor, terms from each of the queries, detect, by the processor, frequent patterns across the set of queries, identify, by the processor, maximal patterns from the frequent patterns detected, and use, by the processor, the maximal patterns to create a rich entity.

A computer-implemented method, according to yet another embodiment, includes: identifying key concepts in a domain ontology, defining a workload as a set of queries, extracting terms from each of the queries, detecting frequent patterns across the set of queries, identifying maximal patterns from the frequent patterns detected, and using the key concepts and the maximal patterns to create a rich entity. Identifying the key concepts includes performing centrality analysis of concepts extracted from the domain ontology.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 8 is a representational view of an algorithm in accordance with one embodiment.

FIG. 9 is a representational view of an algorithm in accordance with one embodiment.

FIG. 10 is a representational view of an algorithm in accordance with one embodiment.

FIG. 11 is a representational view of an algorithm in accordance with one embodiment.

FIG. 13 is a representational view of an algorithm in accordance with one embodiment.

FIG. 14 is a representational view of an algorithm in accordance with one embodiment.

FIG. 15 is a representational view of an algorithm in accordance with one embodiment.

FIG. 17 is a representational view of an algorithm in accordance with one embodiment.

FIG. 21A is a representational view of the structural composition of a rich entity in accordance with one embodiment.

FIG. 21B is a graphical representation of the rich entity of FIG. 21A.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for automatically detecting, learning, and/or creating domain specific rich entities, e.g., as will be described in further detail below.

In one general embodiment, a computer program product includes a computer readable storage medium having program instructions embodied therewith, the program instructions executable by a processor to cause the processor to: identify, by the processor, key concepts in a domain ontology, and use, by the processor, the key concepts to create a rich entity. Identifying the key concepts includes performing centrality analysis of concepts extracted from the domain ontology.

In another general embodiment, a computer program product includes a computer readable storage medium having program instructions embodied therewith, the program instructions executable by a processor to cause the processor to: define, by the processor, a workload as a set of queries, extract, by the processor, terms from each of the queries, detect, by the processor, frequent patterns across the set of queries, identify, by the processor, maximal patterns from the frequent patterns detected, and use, by the processor, the maximal patterns to create a rich entity.

In yet another general embodiment, a computer-implemented method includes: identifying key concepts in a domain ontology, defining a workload as a set of queries, extracting terms from each of the queries, detecting frequent patterns across the set of queries, identifying maximal patterns from the frequent patterns detected, and using the key concepts and the maximal patterns to create a rich entity. Identifying the key concepts includes performing centrality analysis of concepts extracted from the domain ontology.

Figure 1:
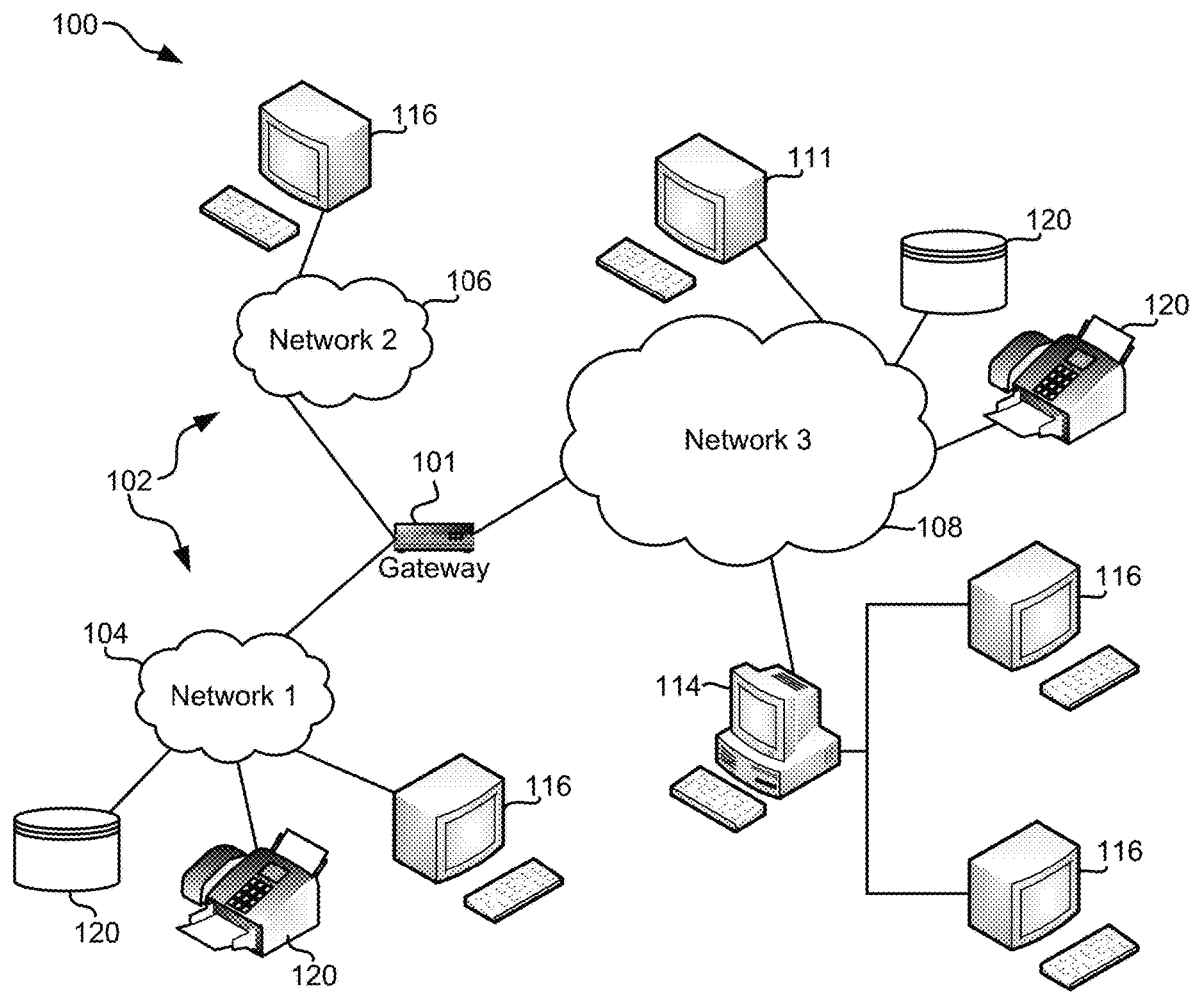
FIG. 1 is a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
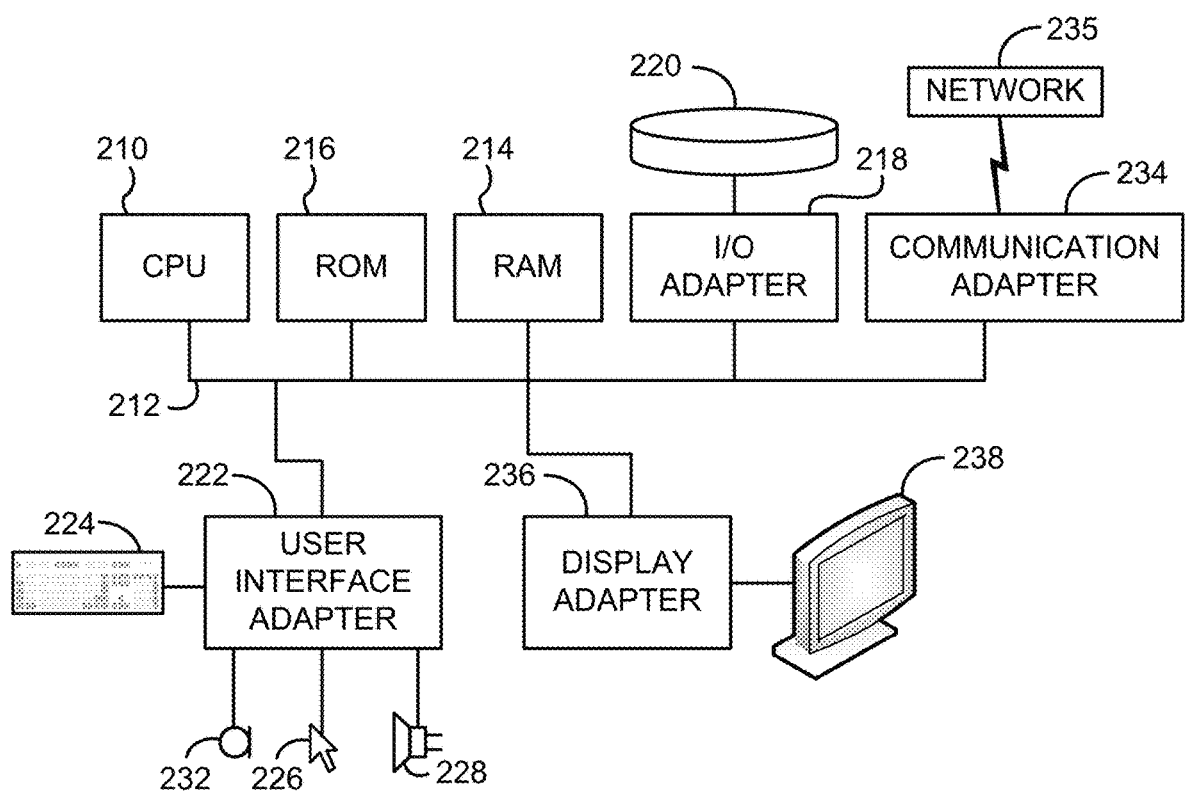
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
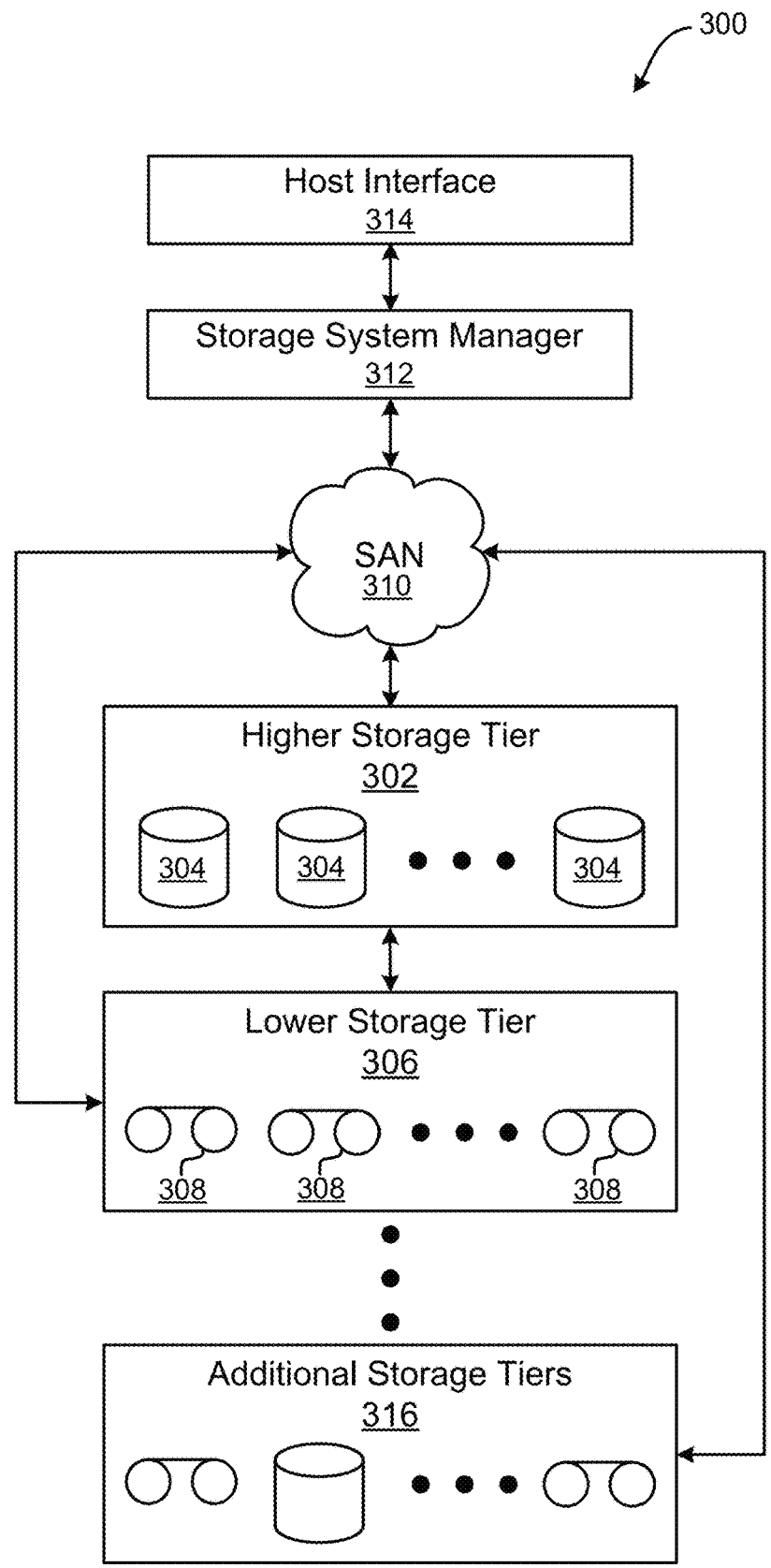
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, organizations from a variety of different domains produce massive amounts of data. Conventional knowledge bases provide a mechanism which is able to store, index and query vast amounts of integrated content that has been derived from these data sources. Constructing such a comprehensive form of knowledge representation, typically involves a pipeline of processes including data collection or ingestion, enrichment (cleaning and integration), storing and indexing. To provide some structure to the data collected from a variety of sources, these conventional knowledge bases are often associated with domain specific metadata called taxonomies, simple glossaries (or dictionaries) and ontologies that together help provide more sophisticated semantics to the integrated data.

Figure 4:
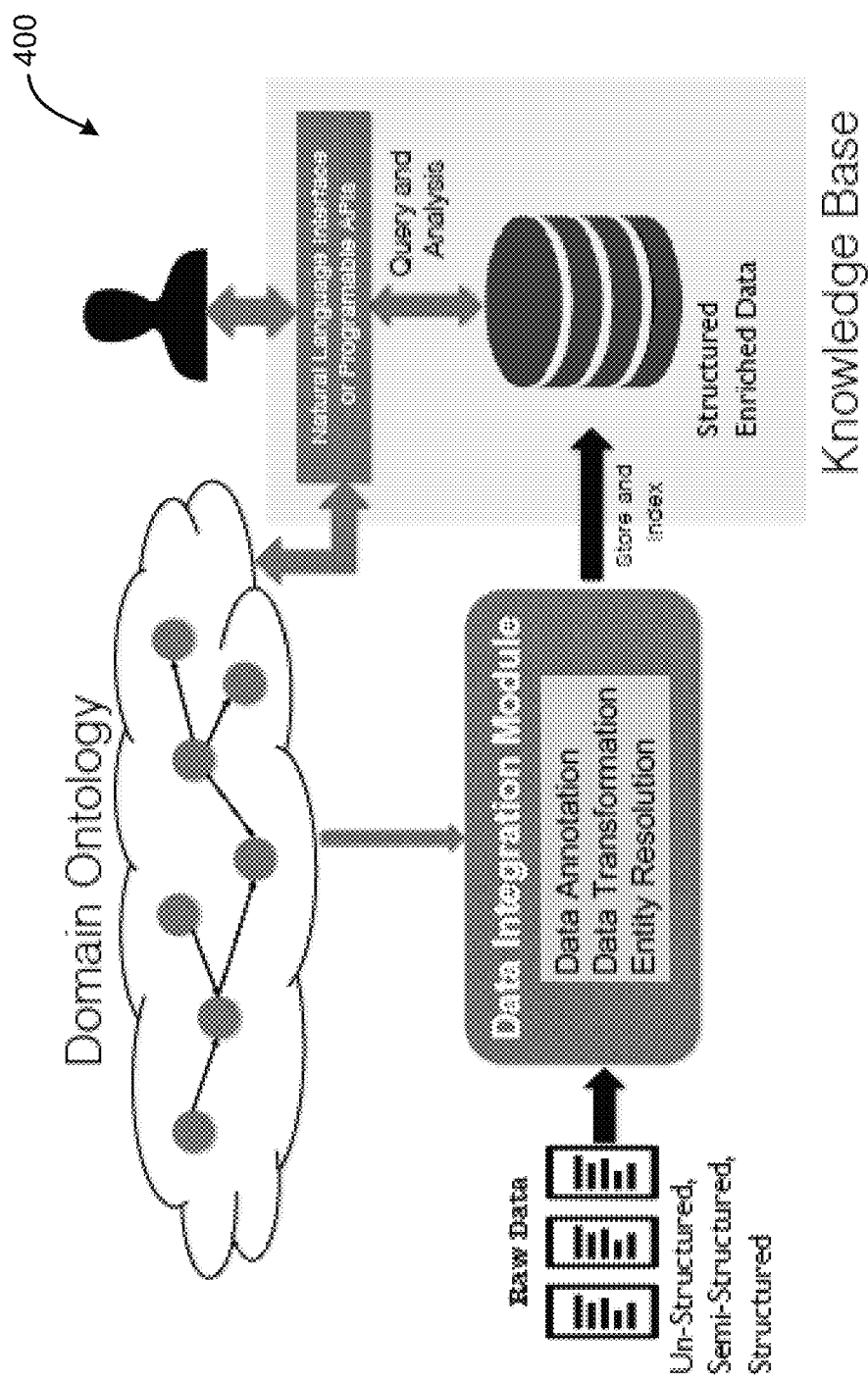
FIG. 4 is a high level representation of a conventional knowledge base architecture.

Looking to FIG. 4, a conventional knowledge base architecture 400 is depicted which uses an ontology as a domain specific lens to provide an entity-centric view over the integrated data. The entity-centric enrichment process is driven by the domain ontology such that the final output conforms in structure to the metadata represented by the domain ontology. The enriched data, essentially a data instance of the ontology (often referred to as the knowledge graph), is then stored in an appropriate backend. This data may be queried in a variety of different ways including, natural language interfaces, programmable application program interfaces (APIs) or using languages such as SQL or SPARQL depending on the actual implementation of the knowledge base. However, the construction, maintenance and/or querying of these types of knowledge bases presents several challenges, especially when concerning significantly large amounts of data. These challenges include dealing with the large-scale and sometimes temporal nature of the data being ingested from a variety of different data sources, as well as domain specific data curation and integration to extract the relevant entities/relations from the underlying raw data being ingested in a variety of different data formats. Furthermore, storing data in appropriate index structures to support a wide variety of query workloads and application domains is also a challenge; as is exposing appropriate interfaces and runtime mechanisms to query and analyze the data stored in the knowledge base.

Conventional knowledge bases and information extraction systems provide different mechanisms which attempt to deal with the above mentioned challenges. However, the focus of these systems is on providing capabilities for querying individual real-world entities, as well as exploring exact information through explicit querying. As previously mentioned, these conventional implementations are not sufficient for the exploration of relevant and context specific information associated with real-world entities stored in these knowledge bases. Users often resort to a tedious manual process of discovering the knowledge base and issuing countless queries to gather the information they desire about a real-world entity. For example, depending on the number of different facts about a given company a user desires, the user may have to construct and issue a corresponding number of ad-hoc queries to the knowledge base. Accordingly, the organization and availability of data in conventional knowledge bases is not suitable.

In sharp contrast, some of the embodiments included herein introduce data storage systems which have the ability to respond to entity-centric user queries with a rich object that not only contains information about the queried entity itself, but also relevant information from entities that are related to the entity in question. Objects having such functionality are referred to herein as "rich entities". For example, if an individual is requesting the founding year of a particular company, the individual may also want to know about the key officers (i.e. person entities) of the company, as well as the company's net revenue. It follows that rich entities enhance a user's experience by providing richer information about entities that the user cares about, thereby overcoming conventional shortcomings associated with obtaining the same information.

One of the challenges regarding returning information in addition to that which was specifically requested is identifying the appropriate amount and relevance of the additional information to return. Simply returning all the information associated with all the entities related to the queried entity may lead to an information overload, as the response contains much more information than what the requesting individual actually wants. Moreover, detecting concepts that can be considered as candidates for forming rich entities also serves as a challenge. Accordingly, various embodiments described herein introduce the ability to identify rich entities in a given domain, and/or select the relevant and context-specific information to include in those rich entities. Thus, rich entities may desirably implement the relevant and context specific information grouped together around real-world entities, serving as efficient and meaningful responses to user queries. In some approaches, this may be accomplished by using query logs of previous users, domain knowledge in the form of ontologies, etc. For instance, rich entities may be created by grouping together information not only from a single entity represented as an ontology concept, but also related concepts and properties as specified by the domain ontology, e.g., as will soon become apparent.

In order to better understand how rich entities relate to domain ontologies, a brief description of domain ontologies and query languages corresponding to domain ontologies is presented.

Domain Ontologies

An ontology describes a particular domain and provides a structured view over domain specific data. More specifically, an ontology describes in detail the entities that are relevant for that domain, the properties associated with the entities, and the relationships across different entities. It provides an expressive data model that may capture a variety of relationships between entities such as functional, inheritance, unions, etc. Ontologies thus are useful in comprehensively describing and understanding the data model for a variety of real world data sets and application domains.

According to an example which is in no way intended to limit the invention, an ontology of O(C, R, P) where, $C=\{c_n|1 \le n \le N\}$ denotes the set of concepts (or entities), $R=\{r_k|1 \le k \le K\}$ denotes the set of relationships between the concepts, and $P=\{p_m|1 \le m \le M\}$ is the set of all data properties. Together, these representations provide a structured view of a real-world domain. Moreover, here the ontology may formally be described such that a concept is defined as a "class", a property associated with a concept is defined as a "DataProperty", and each relationship between a pair of concepts is defined as an "ObjectProperty". Each DataProperty $p_i \in P_n$ may represent a unique characteristic of a concept $c_n \in C$ and $P_n \subseteq P$ represents the set of DataProperties associated with the concept $c_n$. For simplicity, the notation $c_n \cdot p_i$ may be used to represent property $p_i$ belonging to concept $c_n$. Each ObjectProperty $r_k=(c_s, c_d, t)$ is associated with a source concept $c_s \in C$, which may also be referred to as the domain of the ObjectProperty, a destination concept $c_d \in C$, also referred to as the range of the ObjectProperty and a type t. Depending on the approach, type t may be either functional (a 1-1 relationship between two concepts), an inheritance relationship (also called a is-A relationship), or a union/membership relationship.

Figure 5:
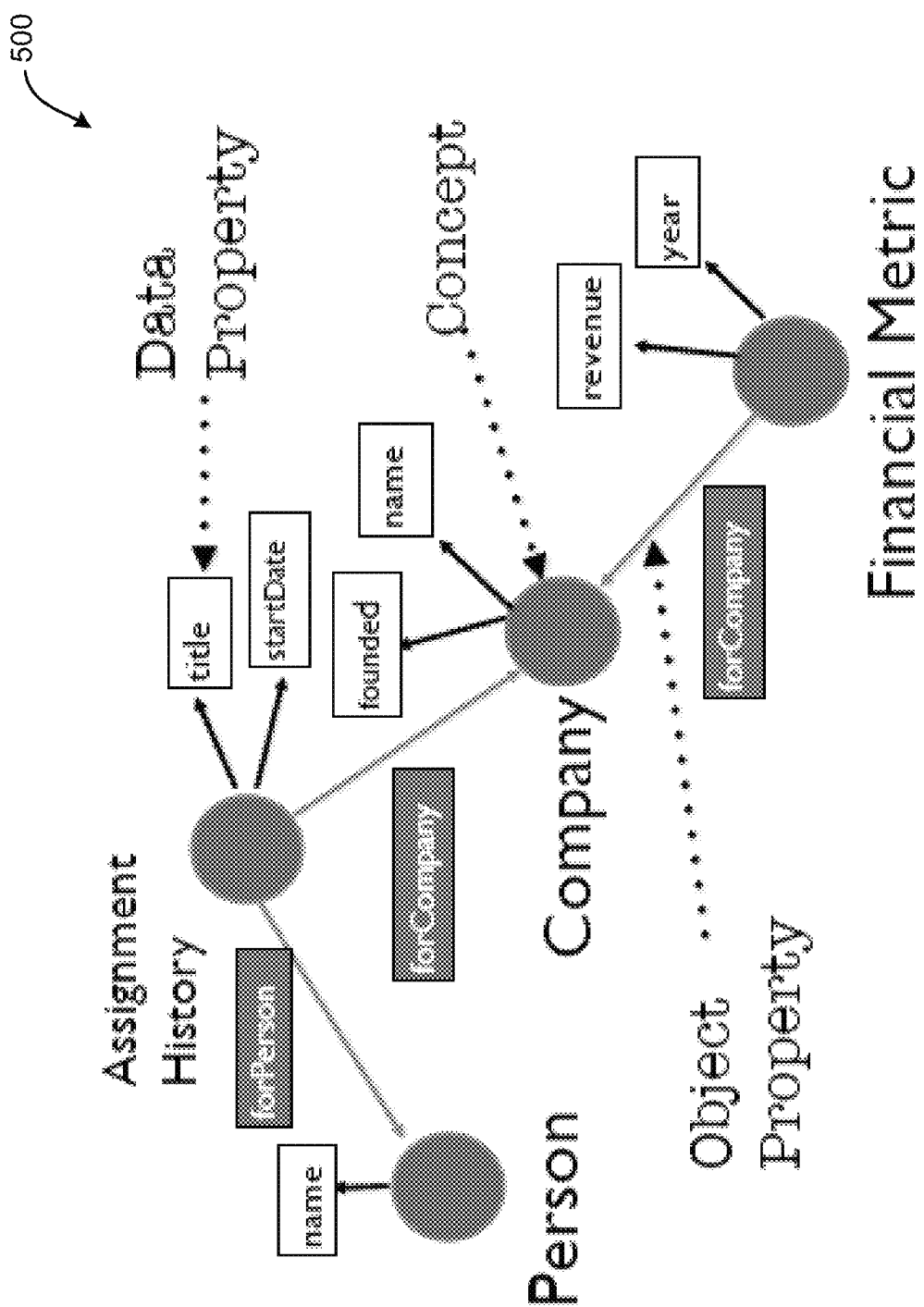
FIG. 5 is a high level representational view of a sample ontology in accordance with one embodiment.

Referring to FIG. 5, a sample ontology 500 is depicted having concepts including Company, Person, Assignment history and Financial Metric. As shown, each of these concepts is associated with a respective set of data properties (e.g., revenue, year, name, title, etc.). Moreover, the object properties are labelled (e.g., for Company or for Person) to show associations between the concepts.

Ontology Query Language (OQL)

The queries submitted against a knowledge base may be optimized and executed in several different ways depending on how the data is indexed and stored. For knowledge bases that are associated with ontologies, user queries can be transformed into queries over the domain ontology graph and are expressed in an OQL. This provides an efficient abstraction for expressing queries against the knowledge base independent of the underlying back end used to store and access the data. These OQL queries may further be translated to appropriate backend queries. It should be noted that although OQL is used as an illustrative language with a well-defined syntax and semantics in various embodiments described herein, any other language may be used to represent queries over the ontology, e.g., as would be appreciated by one skilled in the art after reading the present description. For instance, any other language which supports and/or provides constructs for projection, aggregation, filter, join and iteration over sets of ontology concepts may be implemented, e.g., depending on the desired embodiment.

In the context of a data model, OQL represents queries that operate on a set of concepts and relationships in an ontology. Instances of a concept and data properties associated thereto may be referred to as individuals. Furthermore, each individual may be associated with a type that is defined in the ontology. In preferred approaches, the OQL supports all data types that are supported as types for data properties associated with concepts in the domain ontology such as integers, boolean, strings, etc.

Moreover, as a language, OQL may express queries over the ontology agnostic to the implementation of the underlying storing and indexing mechanism of the knowledge base. OQL may also express sophisticated queries that include aggregations, unions, nested sub queries, etc. An OQL query may be a single query block or a union of multiple OQL query blocks depending on the approach. Each OQL query block includes a SELECT clause and a FROM clause. Optionally, an OQL block may also include a WHERE clause, a GROUP BY clause, an ORDER BY clause, A FETCH FIRST clause, as well as a HAVING clause, as will be described in further detail below. Moreover, the "Concept", "Property", and "Relation" terms in each clause may refer to the corresponding ontology elements (e.g., see FIG. 5).

The SELECT clause may contain a list of ontology properties which can be either aggregation, or regular properties, depending on whether an aggregation function is applied thereto. The list of supported aggregation functions may include SUM, AVG, MIN, MAX, and COUNT. The GROUP BY clause may specify an ordered list of ontology properties that a user may wish to group the results by. For instance, if the query block contains a GROUP BY clause, the SELECT list may only contain aggregation functions, or the grouping keys.

Moreover, an OQL query may operate on the set of tuples constructed by the Cartesian product of the concepts referred to in the FROM clause. For each such tuple, WHERE clause predicates are applied, followed by grouping if there is a GROUP BY specification. Then the aggregation in the SELECT list may be computed, and returned, ordered by the properties specified in the ORDER BY clause (if any). Furthermore, if there is a HAVING clause, the predicate in the HAVING clause is applied after the GROUP BY clause. It is preferred that a HAVING clause does not exist without a GROUP BY clause. It is also preferred that a HAVING clause does not contain any predicates that reference functional object properties, or which specifies a join condition.

It should also be noted that OQL may allow three types of predicates in relation to the WHERE clause. Illustrative examples of these three types of predicates include: (1) predicates used to compare concept properties with constant values, (2) predicates used to express joins between concepts, and (3) predicates that are used to compare concept properties with a fixed set of values, potentially computed via a nested query. In general, OQL may be composable and may allow an arbitrary level of nesting in the SELECT, FROM, WHERE and HAVING clauses. Further still, if the query block contains a FETCH FIRST clause, then only the number of rows specified in this clause may be returned, instead of the whole result set. Also, a FETCH FIRST clause may typically be used in conjunction with an ORDER BY clause to deterministically define which tuples end up in the top k.

According to a first in-use example of an OQL query, which is in no way intended to limit the invention, a query stating "show me total shares offered in all foreign IPOs by company" joins the Issuer Company concept with the IPO concept in the ontology. Specifically, only the foreign IPOs are selected, while the total shares for each such company are returned, grouped and ordered by the company name, as follows:

| | |
|---|---|
| SELECT | Sum(ipo.shares), ic.name |
| FROM | IPO ipo, Issuer Company ic |
| WHERE | ipo.foreign = true AND ipo -> ofCompany = ic |
| GROUP BY | ic.name |
| ORDER BY | ic.name |

According to another in-use example of an OQL query, which is in no way intended to limit the invention, a query stating "show me all loans taken by Caterpillar by lender" joins three concepts in the ontology which include "lender", "borrower", and "loans". In this exemplary query, Caterpillar is the borrower. The condition br=1->borrowedBy says the borrower instance should be reachable by following the borrowedBy relationship from the "loans" concept. To find the lenders, it is important to connect to the same loans instance via the lentBy relationship. This query thereby returns the total loans borrowed by Caterpillar grouped by each lender, as follows:

| | |
|---|---|
| SELECT | Sum(l.amount) |
| FROM | Loans l, Lender ld, Borrower br |
| WHERE | br = 1 -> borrowedBy AND br.name |
| | IN ('Caterpillar', 'Caterpillar Inc.) |
| | AND ld = 1-> lentBy |
| GROUP BY | ld.name |

As previously mentioned, rich entities may be formed by grouping together information not only from a single entity represented as an ontology concept, but also related concepts and properties as specified by the domain ontology. Rich entities according to any of the embodiments described herein may be able to provide richer information associated with entities, the information being more meaningful, relevant and context specific, while also improving efficiency of responses to user queries which would have otherwise required expensive joins across multiple concepts at run time, as well as providing users with unique information about entities that would otherwise be exceedingly difficult to query explicitly.

Each rich entity may be formed around a concept of a domain ontology which is referred to as a "Key Concept". Moreover, the rich entity includes a grouping of relevant and context specific information as simple and complex data properties attached with each instance of the key concept. In some instances, the metadata which describes the structure and composition of a rich entity may be considered to be a subgraph of a domain ontology graph, the subgraph grouping together the relevant concepts and relations around the key concept derived from the ontology graph. For example, looking to FIG. 6, an example of a rich entity 600 shown as a subgraph over a financial domain ontology 650 for a given company is shown according to one embodiment. The rich entity 600 includes the Company as the Key Concept, in addition to complex properties such as Assignment History and Financial Metric. Direct properties such as revenue, title, year and name are also included in the rich entity 600.

Figure 6:
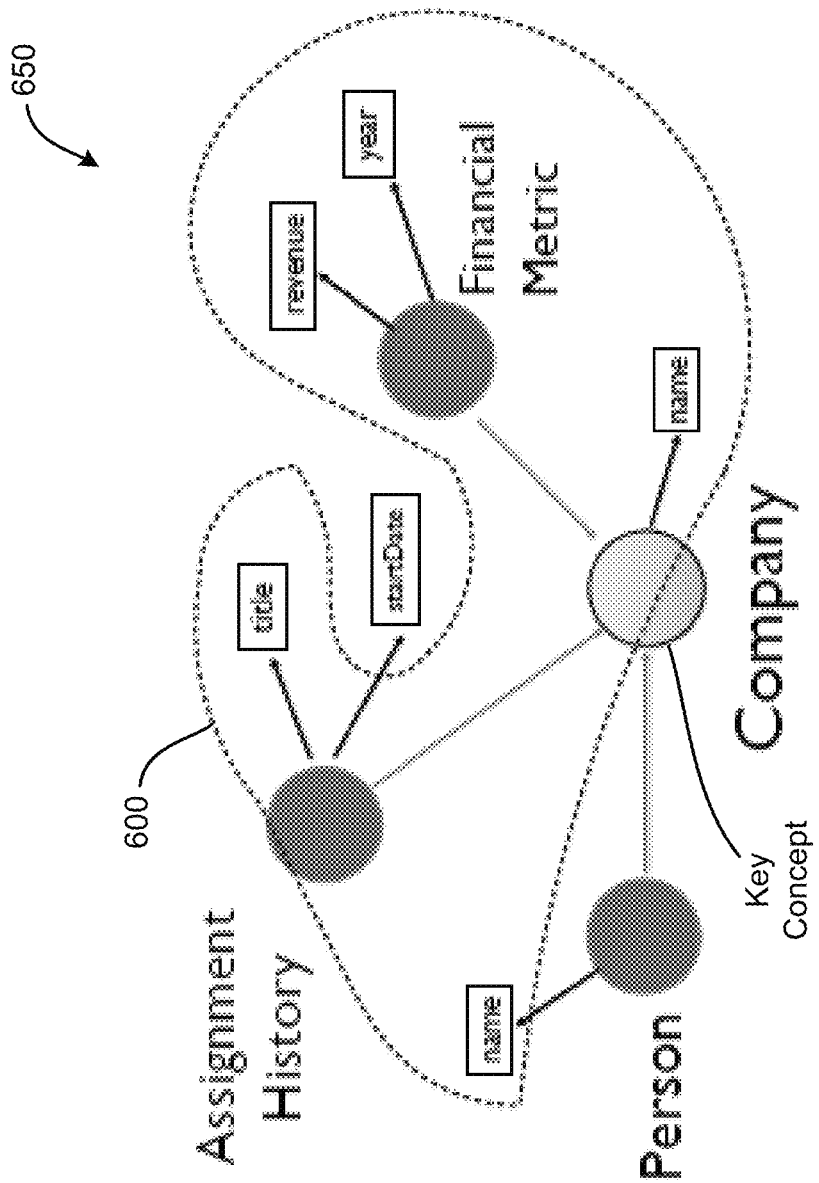
FIG. 6 is a high level representational view of a rich entity with respect to a domain ontology in accordance with one embodiment.

Although FIG. 6 illustrates an exemplary overarching visualization as to how a rich entity may be formed using concepts of a domain ontology, actually forming a rich entity involves significant challenges. In addition to those challenges listed above, creating a rich entity involves automatically (e.g., without human input) detecting the key concepts which may be enriched in content to become rich entities, as well as automatically identifying the grouping of concepts and/or relations in a base ontology which would inform the content of the identified rich entities.

Figure 7A:
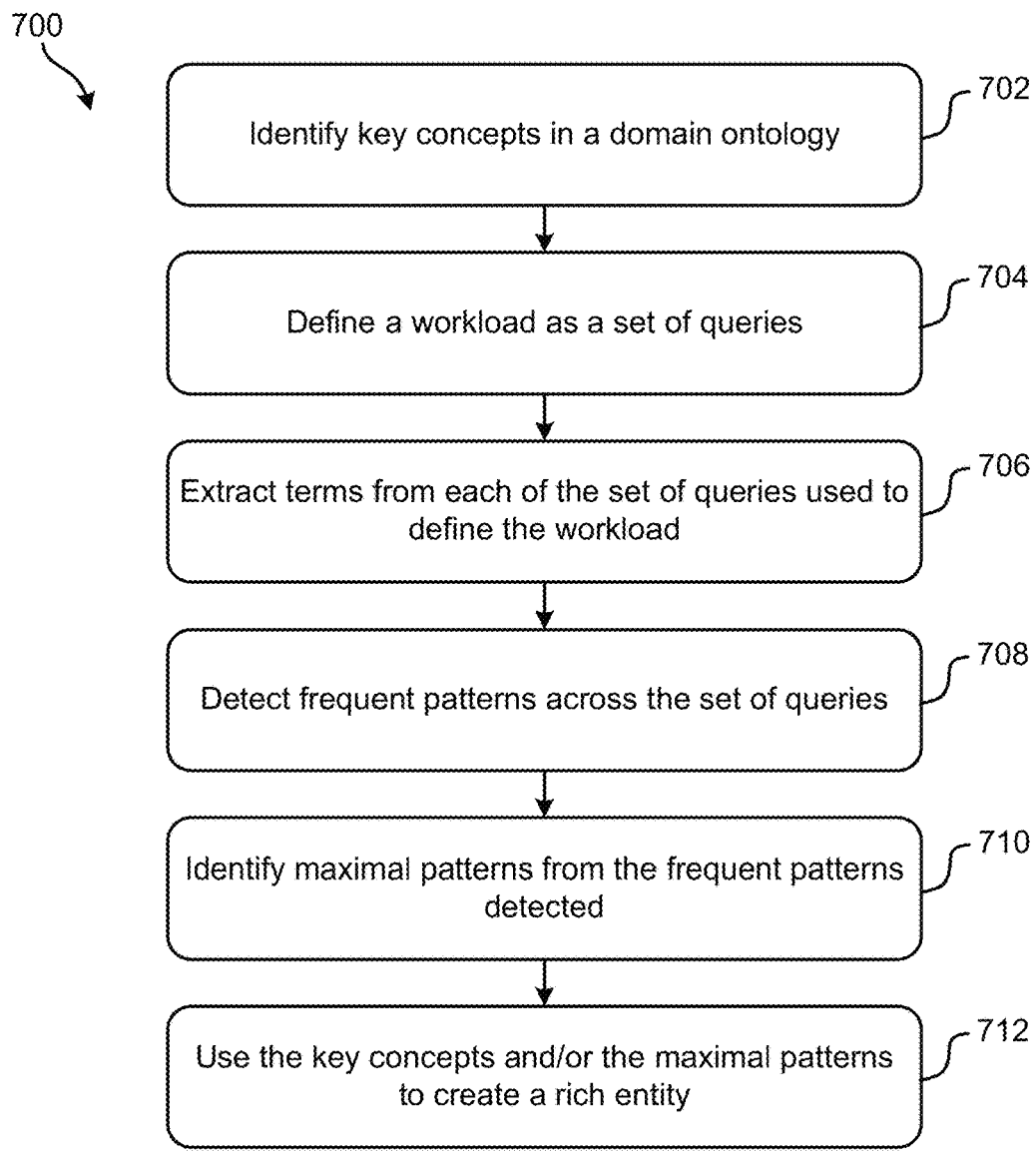
FIG. 7A is a flowchart of a method in accordance with one embodiment.

Now referring to FIG. 7A, a flowchart of a computer-implemented method 700 is shown according to one embodiment. Specifically, the various operations included in method 700 may be used to automatically detecting, learning and creating rich entities. The method 700 may be performed in accordance with the present invention in any of the environments depicted in FIGS. 1-3, among others, in various embodiments. Of course, more or less operations than those specifically described in FIG. 7A may be included in method 700, as would be understood by one of skill in the art upon reading the present descriptions.

Each of the steps of the method 700 may be performed by any suitable component of the operating environment. For example, in various embodiments, the method 700 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7A, operation 702 of method 700 includes identifying key concepts in a domain ontology. As previously mentioned, the structural information embedded in a domain ontology may be leveraged (e.g., used) to identify the key domain concepts which may be considered as candidates for composing rich entities around them. According to an illustrative approach, the ontology for a particular domain may be viewed as a property graph OG=(V, E) where V represents the set of nodes (each node representing a concept in the ontology), and E represents the set of edges between nodes (each edge representing an Object-Properties, or relation, between the concepts that it connects). Moreover, each node (or concept) v∈V is associated with a set of dataProperties $P_v \in P$, where P represents the set of all properties supported by the domain ontology. Each edge (or objectProperty) e∈E is associated with a source node $v_s$, a destination node $v_d$ and a type t, indicating whether it is a functional relationship, an is-A (inheritance) relationship or a union membership. This property graph representation of the ontology provides useful domain specific structural information such as graph connectivity, in/out degree distribution of the concepts in the ontology, inheritance, union/membership relationships, etc. Using graph centrality measures, the ontology graph may thereby be analyzed in order to determine the key concepts in a domain that are structurally independent and can stand on their own.

For example, referring back to FIG. 5, the concept Company is a key concept that can stand on its own as compared to the concept Financial Metric which is dependent on the concept Company for its existence. Structurally independent concepts like Company are classified as key concepts which again are considered as candidates for composing rich entities around them.

With continued reference to FIG. 7A, identifying the key concepts as included in operation 702 may include performing centrality analysis of concepts extracted from the domain ontology. Performing the centrality analysis may include determining an ontology page rank value for each concept in an ontology graph. Moreover, according to preferred approaches, the Ontology Page Rank Algorithm Algorithm 1 of FIG. 8 is implemented (e.g., executed) in order to determine an ontology page rank value for each concept in an ontology graph. In other words, operation 702 preferably includes implementing the Ontology Page Rank Algorithm of FIG. 8.

Referring momentarily to FIG. 8, the Ontology Page Rank Algorithm modifies the graph structure of OG by first duplicating the edges to/from union concepts and changing their source and destination nodes accordingly, secondly removing the union concepts, and thirdly removing the inheritance edges (type=is-A) while adding a reverse edge for every remaining edge in the graph. The Ontology Page Rank Algorithm then runs a standard Page Rank algorithm to obtain the page rank values for each vertex in the modified graph, whereby the inheritance edges are then added back to the graph. The function updatePR(v) updates the Page Rank value of each node by performing a depth first traversal over the corresponding subclass (is-A) relationships as mentioned below. Finally, the Ontology Page Rank Algorithm returns the ontology graph OG wherein each v∈V is updated with its respective ontology page rank value.

The Ontology Page Rank Algorithm provides several unique features for identifying key concepts for a rich entity, which would be apparent to one skilled in the art after reading the present description. For instance, performing the Ontology Page Rank Algorithm handles (e.g., caters for, provides, etc.) inheritance and subclasses in the domain ontology. These features may be captured as special object properties in the ontology property graph labelled as is-A relationships. To cater for these relationships, the subclass relationships may be removed from the graph while running the initial Page Rank algorithm. This allows the page ranks of a concept to be calculated based on the links from other concepts that are not subclasses of the same concept. After computing the page rank values of all concepts, the edges are re-attached and the page ranks of each concept are updated by performing a depth first traversal over the subclass (is-A) relationships in order to find the parent/ancestor with the highest page rank value. If this value is higher than the current value of the page rank of the concept, the page rank with the new highest value is designated as the new page rank value of the concept. This enables a child concept to inherit the page rank value of its parent/ancestor (if it is higher than its own actual page rank). This is intuitive as a child concept inherits all its other properties from the same chain of concepts and hence would have a similar estimate of centrality.

Performing the Ontology Page Rank Algorithm may also cater for unions and complex classes in the domain ontology. These features may result, at least in part, from the OWL language providing logical elements such as AND, OR, NOT which are equivalent to intersection, union and complement operations respectively, in set theory. These logical elements enable modeling of complex classes, e.g., such as a union of two or more classes. Each data element of the union class may actually be an instance of at least one of the classes comprising the union. The union concept in the ontology thus represents a logical membership of two or more concepts. Any incoming edge to a union concept can therefore be considered as pointing to at least one of the member concepts of the union. Similarly, each outgoing edge can be considered as emanating from at least one of the member concepts of the union.

To manage union concepts, the Ontology Page Rank Algorithm iterates over each incoming/outgoing edges to/from the union concept, respectively. Each incoming/outgoing edge to the union concept is replicated, thereby creating one replica per member concept of the union. For each incoming edge to the union concept, new edges are created between the source concept and each of the member concepts of the union. Similarly, for each outgoing edge, new edges are created between the destination and each of the member concepts of the union. Thus the page rank mass is appropriately distributed to/from the member nodes of the union. Finally, the union node itself is removed from the ontology graph as its contribution towards centrality analysis has already been accounted for by the new edges to/from the member concepts of the union.

Performing the Ontology Page Rank Algorithm may further provide weightage to out-degree of nodes of the domain ontology. In the page rank algorithm, the distribution of the page rank weight is proportional to the in-degree of a node as it receives page rank values from all its neighbors that point to it. In other words, nodes with a high in-degree would tend to have a higher page rank than nodes with a lower in-degree. However, for a domain ontology, it is observed that a concept's relevance as a stand-alone or key concept is dependent both on its in-degree and out-degree. Therefore, steps are taken in order to ensure that due weightage is given to concepts with a high overall (both in and out) degree in the centrality analysis involving computation of the ontology page rank. Specifically, for each edge in the ontology graph, the Ontology Page Rank Algorithm adds a reverse edge in the ontology graph, thereby essentially making the ontology graph equivalent to an undirected graph. The ontology page rank analysis may thereby be performed on the resulting modified ontology graph, e.g., in order to determine relevant ontology page rank scores.

It follows that operation 702 of method 700 in FIG. 7A preferably assigns ontology page rank values to each of the ontology concepts, e.g., by implementing Algorithm 1 of FIG. 8. However, according to some approaches, identifying the key concepts as seen in operation 702 may further include performing statistical separation of the concepts based on the page rank value assigned thereto.

Using the Ontology Page Rank Algorithm as described above may determine the ontology page rank values for each concept in the ontology, including concepts that are subclasses of other concepts. These page rank values may be stored as an additional property called 'ontology_pagerank' which may be associated with each node v∈V in the ontology property graph OG. Accordingly, the next step may desirably include statistically separating the concepts (or nodes in the ontology graph) based on the page rank value corresponding thereto, e.g., in order to determine the top concepts to be considered as key concepts for composing rich entities.

This statistical separation may be performed differently depending on the desired embodiment. For instance, two different exemplary algorithms Algorithm 2, Algorithm 3 are illustrated in FIGS. 9 and 10 respectively, which are in no way intended to limit the invention. As shown, each of the two different algorithms Algorithm 2, Algorithm 3 use different statistical techniques to find the top key concepts by page rank values which may be considered as candidates for rich entities.

Referring specifically to FIG. 9, Algorithm 2 determines these top key concepts based on the first derivative of the page rank values of the nodes in the ontology graph. In other words, performing the statistical separation may include using a first derivative of the ontology page rank values, e.g., in response to implementing Algorithm 2. As shown, Algorithm 2 computes the difference vector which includes values that are the difference between each adjacent pair of values in the page rank. The mean and standard deviation (SD) of the difference vector is then computed. Thereafter, the sorted page rank values are iterated over in descending order to determine the first pair of page rank values separated by a sufficient gap. A gap that is at least equal to the value (mean+(SDF×SD)/iteration) may be sufficient, where "SDF" represents the Standard Deviation Factor which is an input parameter to the algorithm, and "iteration" represents the number of passes made over the page rank vector. The algorithm may make multiple iterations over the page rank values if a sufficient gap is not found. Moreover, the size of what qualifies as a sufficient gap may be reduced with each iteration, until values having a sufficient gap are found.

Looking now to FIG. 10, Algorithm 3 operates using the actual page rank values in order to determine the top key concepts with page rank values greater than the value (mean+(SD×SDF)). In other words, performing the statistical separation may include selecting each of the concepts having a page rank value that is greater than a predetermined value, e.g., in response to implementing Algorithm 3. However, it should be noted that the results achieved by implementing Algorithm 3 typically have a sharper cutoff and may not return some nodes with comparable page rank values that do not meet the page rank value criteria. Algorithm 2 on the other hand examines all nodes until a sufficient gap in the page rank values has been determined. Thus, although either Algorithm 3 or Algorithm 2 may be implemented in order to perform the statistical separation of the concepts based on the page rank value assigned thereto, Algorithm 2 is a preferred embodiment.

In addition to identifying key concepts around which candidate rich entities may be formed, query workloads may be leveraged in order to identify and group together concepts (e.g., properties) which may inform the candidate rich entities. According to preferred approaches, this may be accomplished by implementing frequent pattern mining techniques. These techniques may enable frequent query patterns to be observed and identified in the workload, e.g., such as the concepts and properties that users tend to query together the most often. In other words, frequent patterns are essentially viewed as a mechanism to capture the footprint of frequently issued user queries as a subgraph of the domain ontology and encapsulate the same information as a collection of concepts, attributes and data properties.

Therefore, referring back to FIG. 7A, method 700 also includes defining a workload as a set of queries. See operation 704. According to an illustrative embodiment, a workload W={Q1, Q2, ..., $Q_n$} may be defined as a set of OQL queries that have been issued against the domain ontology graph. As discussed above, each OQL query block may include a SELECT clause and a FROM clause. Optionally, the OQL query block may include a WHERE, GROUP BY, ORDER BY and/or HAVING clause. OQL is composable and allows nested OQL queries in the SELECT, FROM, WHERE and HAVING clauses. It should be noted that a query workload may include a set of queries expressed over the domain ontology using any ontology query language. As mentioned above, although OQL has been used as the ontology query language to express the workload queries, other ontology query languages may be implemented as would be appreciated by one skilled in the art after reading the present description.

Once a workload has been defined, e.g., as seen in operation 704, a query workload pattern extraction mechanism may be performed in order to identify frequent query patterns in the workload. According to some approaches, operations 706, 708, 710 may be sub-processes of an exemplary query workload pattern extraction mechanism as follows. Looking first to operation 706, terms are extracted from each of the set of queries used to define the workload. Moreover, operation 708 includes detecting frequent patterns across the set of queries. Furthermore, operation 710 includes identifying maximal patterns from the frequent patterns detected. Each of operations 706, 708, 710 will be described further in turn below.

Examining operation 706 in further detail, the extraction of terms from each query may be considered to involve term creation. According to some approaches, each OQL query may be split into a set of OQL terms, where $T=\{T_1, T_2, \ldots, T_k\}$. Each of these terms may be extracted from any one or more of SELECT, FROM, WHERE and GROUP BY OQL clauses. Moreover, depending on the clause a given term is extracted from, the term may have different structures and can be grouped into one of two categories which include queried terms and context terms.

Queried terms provide information regarding the concept and/or properties (which are also referred to herein as "attributes") that a user may be interested in. According to some approaches, the queried terms include the set of terms "S" extracted from a SELECT clause (the projection items). Each such term may be assigned a term type "Queried", and associated with an ontology concept and/or an attribute. Optionally, queried terms may have an aggregation function for the SELECT terms that have an aggregation associated with them. In some approaches, the OQL query contains a GROUP BY clause which implies the SELECT list contains only aggregations, or grouping keys (the GROUP BY terms). As a result, no further action may be taken as these terms would have already been included in the queried terms as part of the SELECT clause.

The SELECT clause may also have a nested query block as one of the projection terms. The queried terms in that instance may include a term having the concept and attribute returned by the nested query as the projected term. For an arbitrary level of nesting, the queried terms may be constructed from the projection items of the outermost query. The terms from the FROM clause contain concepts touched (influenced) by the query. Therefore, these terms from the FROM clause may provide no additional information, as the concepts that the query is interested in are already accounted for by the SELECT clause terms. The structure below may be used to formally define a queried term according to an exemplary embodiment, which is in no way intended to limit the invention:

```
struct {
  Term_Type;
  Concept;
  Attribute;
  Aggregation_Function;
} Queried_Term;
```

With respect to context terms, they provide the context in which the user is asking for the projection or queried items. Context terms include terms from the WHERE clause of the OQL query which have predicates as well as terms that have object properties. Accordingly, each such extracted OQL term may be assigned a term type "Context". Moreover, the context terms may further be classified into three subcategories which include predicate context terms, join condition context terms, and nested query context terms, each of which are described in further detail below.

Predicate context terms may include an ontology concept, an attribute and a predicate on the attribute. According to one approach, the attribute predicate may include a predicate type and a list of values or literals. The structure below may be used to formally define a predicate context term according to an exemplary embodiment, which is in no way intended to limit the invention:

```
struct {
  Term_Type;
  Concept;
  Attribute;
  Predicate_Type;
  Values;
} Context_Term (Predicate);
```

With respect to join condition context terms, these terms include the ObjectProperties that provide information on how the concepts involved in the query are connected to each other. The structure below may be used to formally define a join condition context term according to an exemplary embodiment, which is in no way intended to limit the invention:

```
struct {
  Term_Type;
  Concept_1;
  Concept_2;
  Object_Properties;
} Context_Term (Join_Condition);
```

Furthermore, referring now to nested query context terms, if the predicate in the WHERE clause includes of a nested sub-query, then the value of the predicate in the outer query may be a computed term generated by the inner nested query. These context terms preferably include an ontology concept, an attribute, a predicate type and a list of computed values. This process may be repeated recursively, thereby generating a context term for each level of nesting in the WHERE clause. The following structure may be used to formally define a nested query context term according to an exemplary embodiment, which is in no way intended to limit the invention:

```
struct {
  Term_Type;
  Concept;
  Attribute;
  Predicate_Type;
  Computed_Values;
} Context_Term (Nested_Queries);
```

OQL terms may further be converted into strings, e.g., so that each query may be represented as a set of strings. Two in-use examples of converting OQL terms into strings is presented below in the Examples section under Example 1 and Example 2. These strings may thereby be provided as input to a frequent pattern mining algorithm, e.g., as will soon become apparent.

Referring now to operation 708 in further detail, in preferred approaches, detecting frequent patterns across the set of queries used to define the workload includes performing frequent pattern mining. A frequent pattern mining algorithm may be employed (implemented) to identify the frequent patterns across the given set of queries in the workload W after each query has been broken (separated) into a set of OQL terms, e.g., according to any of the approaches described herein. Each workload query may be considered to be a transaction, while the OQL terms are the item sets for each transaction. Given a set of these transactions and a user-set threshold value $\tau = \text{Min}(S)$ as an input, where Support S of a pattern p with an occurrence frequency frequency(p) may be defined according to Equation 1 below:

$$S = \frac{\text{frequency}(p)}{\text{total \# of queries}} \qquad \text{Equation 1}$$

The frequent pattern mining algorithm outputs a subset of transactions (or queries) that are frequent, i.e. which corresponds to a support S>τ. These subsets may be referred to as "Frequent Item Sets", where each Frequent Item Set may be represented as FI={$T_1, T_2, \ldots, T_n$}, thereby having a set of OQL terms. According to some approaches, an efficient parallel implementation of the frequent pattern mining algorithm may be implemented, e.g., as would be appreciated by one skilled in the art after reading the present description. It should also be noted that setting and providing the right value for τ as an input to the frequent pattern mining algorithm is greatly desired. For instance, a value of τ that is high may lead to a high precision in terms of detecting the frequent patterns, but may also suffer from a low recall, as many frequent patterns would be filtered out. While on the other hand, a value of τ that is low may translate to a high recall of frequent patterns but may also suffer from low precision, as spurious patterns may be returned as frequent patterns. In preferred approaches, the value of τ for high precision and recall values may be empirically determined using the frequent pattern mining algorithm.

Finally, referring back to operation 710 in further detail, as mentioned above, the frequent pattern mining algorithm preferably outputs a set of frequent patterns having a support S>τ. Moreover, it should be noted that although the desired frequent patterns have been obtained from the given workload of OQL queries, an important post-processing step may also be performed. According to preferred approaches, this post-processing step involves identifying the maximal patterns amongst the output set of frequent patterns. The frequent patterns have been derived by the frequent pattern mining algorithm from actual workload queries which have a complete set of projection and predicated attributes as set by the user. Thus, the frequent patterns that are observed from these queries might not necessarily be as complete as the actual queries due to slight variations in the queried and/or context terms. Therefore, a mechanism capable of identifying only the maximal patterns from the output set of frequent patterns, and using those identified maximal patterns for forming the rich entities is preferably implemented.

According to some approaches, a pattern "p" may be considered maximal when there is no other pattern in the result set of frequent patterns that is a super set of p. The maximal patterns provide additional completeness in terms of the number of projected and/or queried terms, as well as the maximum context in terms of predicated and/or context terms. Referring momentarily to FIG. 11, an exemplary algorithm Algorithm 4 for identifying maximal patterns is illustrated, which is in no way intended to limit the invention. As shown, Algorithm 4 takes the list of frequent patterns (or frequent item sets) as an input $L_{FI}$, and outputs a set of maximal patterns $L_{MP}$. The algorithm first sorts the list of frequent patterns $L_{FI}$ by the size of the item sets in descending order. Algorithm 4 then initializes $L_{MP}$ with the largest frequent pattern in the list $L_{FI}$. Thereafter, for each of the remaining frequent item sets, the algorithm iterates over $L_{MP}$ to determine whether the frequent pattern is fully contained in one of the existing maximal frequent patterns. The frequent pattern is discarded in response to determining that the frequent pattern is fully contained in one of the existing maximal frequent patterns, otherwise the frequent pattern is added to $L_{MP}$. Finally, the algorithm returns the set of maximal patterns $L_{MP}$ identified from the input $L_{FI}$. An in-use example of identifying maximal patterns is presented below in the Examples section under Example 3, which may be referred to for additional relevant information.

Referring again to FIG. 7A, method 700 includes using the key concepts identified in operation 702 and/or using the maximal patterns identified in operation 710 to create a rich entity. See operation 712. In order to create a meaningful rich entity which would desirably improve a user experience, one or both of two different inputs may be used for informing the creation of rich entities. As described above, the domain ontology structure may be leveraged as a property graph in some approaches to extract key concepts. Moreover, a centrality analysis of the ontology graph may be implemented in order to identify a key concept around which a rich entity may be formed. Furthermore, a user workload in terms of the OQL queries over the domain ontology may be leveraged in order to identify query patterns. These identified patterns may be viewed as groupings of the concepts and relations that are frequently queried together in the context of a key concept. This information may thereby be used to form a rich entity around the key concept.

Each frequent (maximal) pattern may represent a set of OQL terms T={$T_1, T_2, \ldots, T_k$}. Moreover, each frequent pattern provides information about the set of concepts, attributes and aggregations that are being frequently queried together in the workload. Accordingly, developing an automated mechanism which is able to use these frequent patterns to form the correct candidate rich entities as identified from the analysis of the domain ontology graph would be greatly desired. However, there are several challenges involved with designing and developing an automated mechanism of populating the identified rich entities using the discovered frequent patterns. These challenges pertain to forming the rich entities and determining the structural composition of the rich entities. Forming the rich entities involves identifying which rich entities a particular frequent pattern should contribute to, which is a difficult challenge as it involves understanding the context in which queries are being submitted by a user. Moreover, having identified the set of frequent patterns which would contribute to the rich entity, a determination as to how the information embedded in each discovered frequent pattern will be structurally composed together to achieve the final composition and structure of the rich entity is still to be made.

Accordingly, to address these challenges, exemplary sub-operations may be implemented to enable forming and structurally composing rich entities using the aforementioned key concepts and/or maximal patterns. Looking to FIG. 7B, creating a rich entity may include clustering the maximal frequent patterns that would contribute to the composition of the rich entity around each of the identified key concepts. See sub-operation 712a. Furthermore, creating a rich entity may also include determining the structural composition of the rich entity. See sub-operation 712b. According to some approaches, the structural composition of the rich entity may be determined by merging the frequent patterns clustered around each key concept, e.g., as will be described in further detail below.

Figure 12:
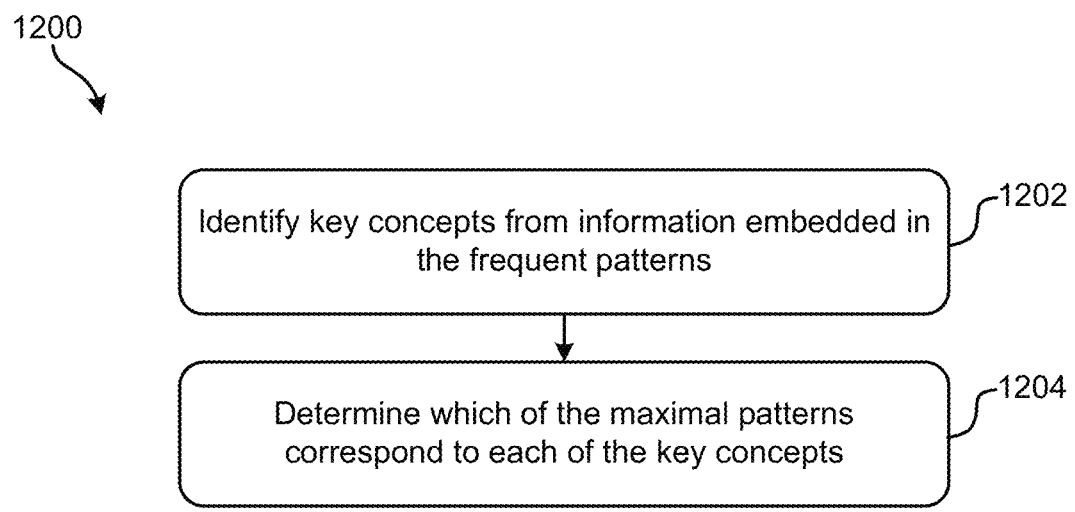
FIG. 12 is a flowchart of a method in accordance with one embodiment.

In alternate embodiments, the maximal frequent patterns may be clustered around each of the identified key concepts using different techniques (algorithms). According to a first exemplary embodiment, a workload only technique (which may also be referred to as a "highest concept support technique") may be implemented to cluster the maximal frequent patterns around each of the identified key concepts. Referring momentarily to FIG. 12, a flowchart of a computer-implemented method 1200 is shown according to one embodiment. The method 1200 may be performed in accordance with the present invention in any of the environments depicted in the FIGS. included herein, among others, in various embodiments. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 12, operation 1202 of method 1200 includes identifying key concepts from information embedded in the frequent patterns, while operation 1204 includes determining which of the maximal patterns correspond to each of the key concepts. Here, method 1200 only uses the discovered maximal frequent patterns, which is information learned from the workload. The key concepts are identified using the information embedded in the frequent patterns, rather than using the domain ontology as described in other embodiments included herein.

Looking now to FIG. 13, an exemplary algorithm Algorithm 5 for performing the above mentioned workload only technique for identifying and informing the rich entities is illustrated, which is in no way intended to limit the invention. At a high level, Algorithm 5 takes a set of identified maximal patterns as an input. The algorithm first computes the support of all concepts across all the identified maximal patterns. The algorithm then iterates over the set of maximal patterns, and for each such maximal pattern, it identifies the concept with the highest support within the maximal pattern. The algorithm then clusters the maximal pattern around this identified concept.

More specifically, as shown, the first half of Algorithm 5 computes the support of all predicated concepts (Term_Type='Context') across all the discovered maximal patterns. The output of this step is a support key-value map that maps each predicated concept in the set of maximal patterns to its support value across all the maximal patterns. In the second half, the algorithm iterates over the set of maximal patterns, and for each such pattern 'mp', the function getConceptWithHighestSp(mp) returns the predicated concept that has the highest support amongst all the predicated concepts within 'mp'. The intuition here is that in a given maximal pattern, a predicated concept with the highest support is the most likely candidate for being a key concept around which a rich entity may be composed. Once the key concept in 'mp' has been determined, the pattern is added to the set of patterns that have already been clustered around the key concept. The algorithm finally outputs the set of key concepts and the set of maximal patterns that have been clustered around each key concept.

According to a second exemplary embodiment, the maximal frequent patterns of sub-operation 712a above may be clustered around each of the identified key concepts by performing a highest page rank technique. Referring now momentarily to FIG. 14, an exemplary algorithm Algorithm 6 for performing a highest page rank technique is illustrated, which is in no way intended to limit the invention. At a high level of general description, Algorithm 6 takes the set of identified maximal patterns as an input, and the ontology page rank scores for each concept. The algorithm then iterates over the set of maximal patterns, and for each such maximal pattern, it identifies the concept with the highest ontology page rank score within the maximal pattern. The algorithm then clusters the maximal pattern around this identified concept.

More specifically, as shown, Algorithm 6 utilizes the computed ontology page rank values of the concepts in the maximal pattern to determine key concepts. The intuition here is that based on the centrality analysis, the concepts with the highest ontology page rank are the candidates which are most likely to be able to stand on their own. The present algorithm therefore identifies these concepts having the highest ontology page rank value as the key concepts. Moreover, Algorithm 6 iterates over each maximal pattern 'mp' and uses the function getConceptWithHighestPR(mp) to determine the predicated concept that has the highest ontology page rank amongst all the predicated concepts in 'mp'. This concept is designated as the key concept and the algorithm then adds the pattern to the set of patterns that have already been clustered around the key concept. The final output of the algorithm is a set of key concepts, each associated with a set of maximal patterns that have been clustered around it.

According to a third exemplary embodiment, the maximal frequent patterns of sub-operation 712a above may be clustered around each of the identified key concepts by performing a top key concept page rank technique. The top key concept page rank technique uses the key concepts having the top ontology page rank values. These top key concepts may be identified using Algorithm 2 of FIG. 9 as an additional input in some approaches. However, looking to FIG. 15, an exemplary algorithm Algorithm 7 for performing the top key concept page rank technique is illustrated, which is in no way intended to limit the invention. At a high level, Algorithm 7 essentially considers each identified top key concept as a bin (e.g., logical bucket). The algorithm takes the set of identified maximal patterns as an input, and the set of key concepts identified from the ontology graph (e.g., using Algorithm 2 and/or Algorithm 3). Algorithm 7 then iterates over the set of maximal patterns, and for each such maximal pattern, it finds all the concepts within the maximal pattern that have been identified as key concepts. The algorithm then clusters the maximal pattern around each such identified key concept. In other words, the algorithm iterates over each maximal pattern 'mp' and determines the key concepts that the maximal pattern contains by performing an intersection between the set of concepts in the maximal pattern and the set of key concepts separately computed using the Ontology Page Rank Algorithm, both sets being inputs to the algorithm.

It should be noted that Algorithm 7 is different than Algorithm 5 and Algorithm 6 because Algorithm 7 not only considers the predicated concepts in the maximal patterns, but also considers concepts that are part of the SELECT clause terms (projection terms). As a result, the maximal pattern may then be assigned to the bin corresponding to each such key concept identified in the maximal pattern. Thus, if a maximal pattern contains more than one key concept, it would contribute to all the key concepts that it contains.

Figure 7B:
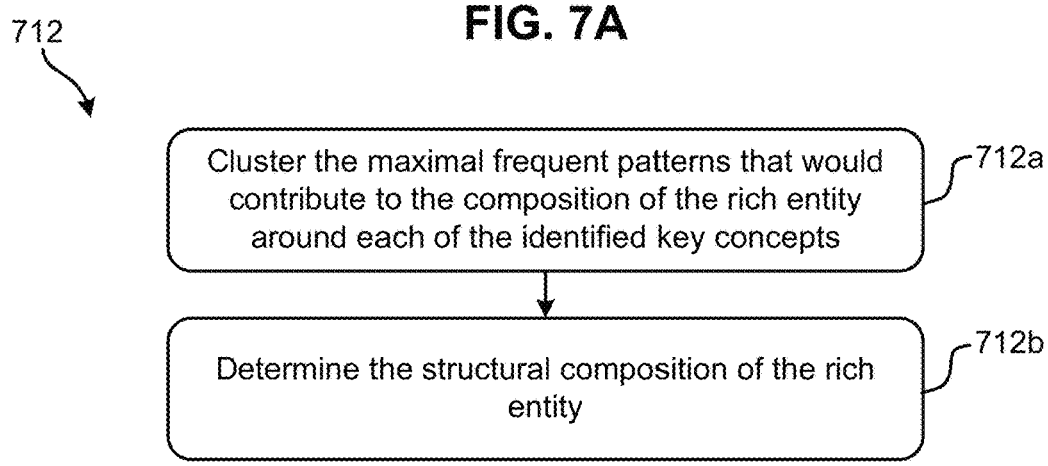
FIG. 7B is a flowchart of sub-operations of an operation in the flowchart of FIG. 7A.
Figure 16:
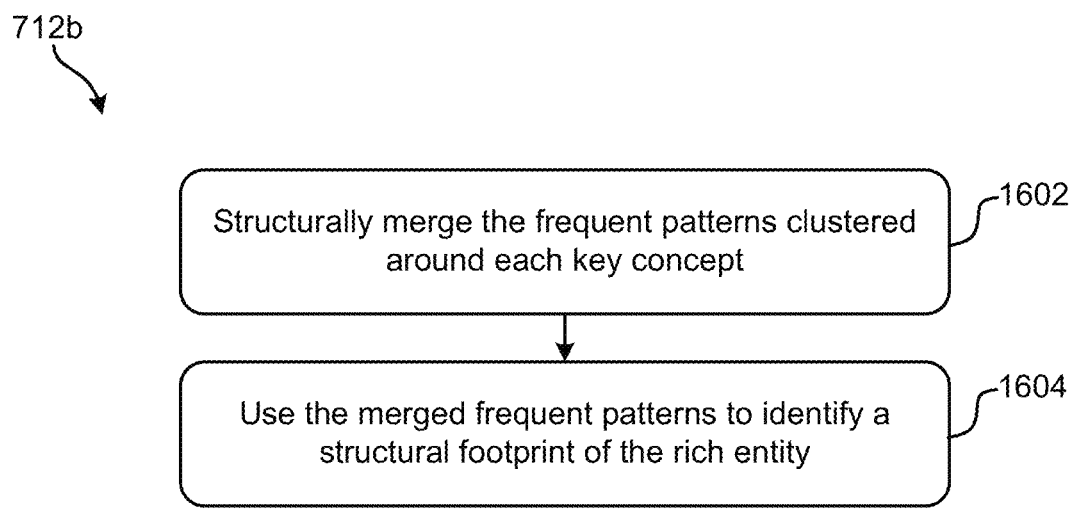
FIG. 16 is a flowchart of sub-processes of a sub-operation in the flowchart of FIG. 7B.

As mentioned above with reference to sub-operation 712b of FIG. 7B, once the maximal frequent patterns have been clustered around each of the identified key concepts according to any of the techniques (algorithms) described above, the structural composition of the rich entity may be determined. Looking to FIG. 16, exemplary sub-processes for determining the structural composition of the rich entity, is shown according to one embodiment. As shown, sub-process 1602 includes structurally merging the frequent patterns clustered around each key concept, while sub-process 1604 includes using the merged frequent patterns to identify a structural footprint of the rich entity.

According to an exemplary embodiment, which is in no way intended to limit the invention, merging frequent patterns clustered around each key concept as seen in sub-process 1602 may be performed by implementing Algorithm 8 of FIG. 17. As shown, Algorithm 8 describes an exemplary technique for merging the frequent patterns that have been assigned to a rich entity, preferably in order to create the structural composition of the rich entity. Each new pattern $p_{new}$ included in the rich entity RE is compared with every other pattern $p_x$ that already exists in the rich entity RE. This is accomplished in the present algorithm by using the function MergePattern($p_{new}$, $MS_{MP}$), where $MS_{MP}$ represents the set of merged patterns that already exist in the rich entity RE.

Figure 18:
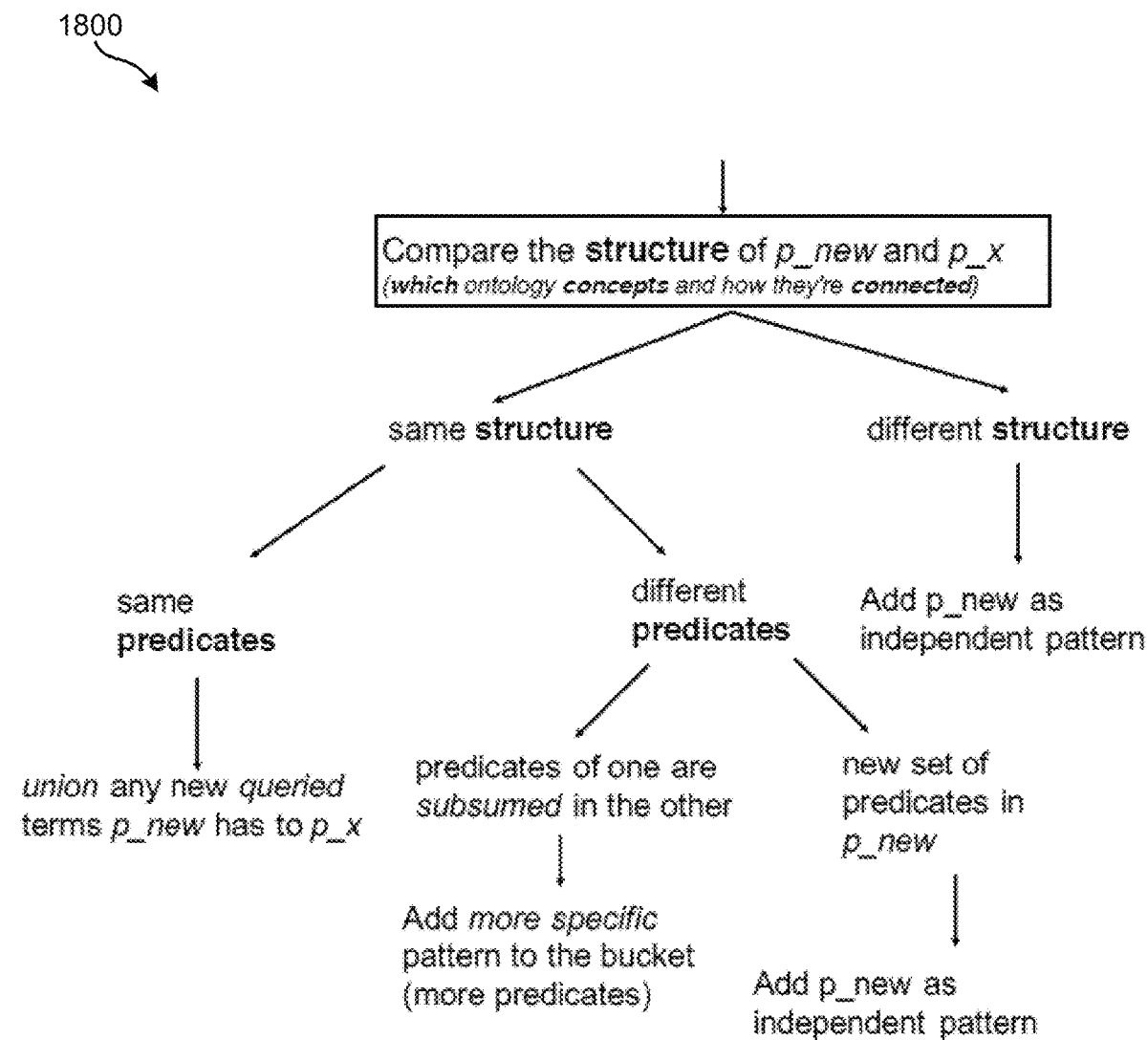
FIG. 18 is a representational view of a decision tree based algorithm in accordance with one embodiment.

The comparison based merge between each pair of $p_{new}$ and px∈$MS_{MP}$ may be performed using a decision tree based algorithm. An exemplary embodiment of a decision tree based algorithm 1800 is depicted in FIG. 18, which is in no way intended to limit the invention. Looking to the algorithm 1800, the set of maximal patterns clustered around a key concept may have significant overlap between each other. The decision resulting from the overlap is whether $p_{new}$ would be added as a separate pattern, or merged with an existing pattern in $MS_{MP}$. As shown, the decision tree based algorithm 1800 first compares the structure of $p_{new}$ and $p_x$. The structure of a pattern is preferably defined in terms of the set of concepts in the pattern and/or the set of edges (e.g., relationships) between them. If the structure is the same and the two patterns have the same set of predicates, then any new projection terms are preferably merged in $p_{new}$ with $p_x$. However, if the structure is same but $p_{new}$ and $p_x$ have different sets of predicates, then an additional check is performed. Alternatively, if the set of predicates of $p_{new}$ are subsumed in the set of predicates of $p_x$ or vice-versa, then the more specific pattern is preferably retained. Further still, if $p_{new}$ has a new set of predicates which are not subsumed in the set of predicates of $p_x$ or vice-versa, then $p_{new}$ is preferably added as a new pattern to the set of patterns associated with the rich entity RE. Finally, if $p_{new}$ and px have a different structure to begin with, then again $p_{new}$ is preferably added as a new pattern.

TheMergePattern(mp; $MS_{MP}$) function as referred to herein preferably compares $p_{new}$ with each $p_x$∈$MS_{MP}$. The result of each such $p_{new}$, $p_x$ comparison is either a decision to merge them into one pattern, or add $p_{new}$ as a new pattern. Deciding to merge $p_{new}$, $p_x$ into one pattern may include either choosing the more specific one of them to retain, or choosing to union them. The function returns a 'true' boolean value in response to deciding to add or merge the pattern with $p_x$, and returns a 'false' boolean value otherwise. Finally, $p_{new}$ is actually added to $MS_{MP}$ if $p_{new}$ cannot be merged with any $p_x$∈$MS_{MP}$. The final output of the merging frequent patterns step is a set of merged patterns that would define the structural foot print of the rich entity around the key concept.

Figure 19:
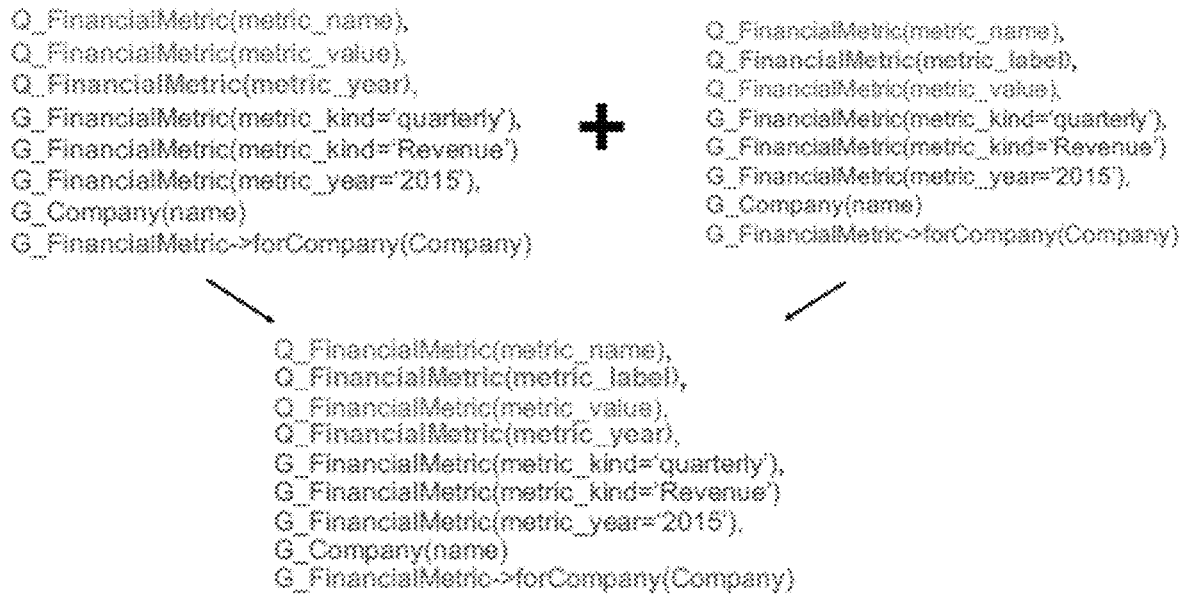
FIG. 19 is a representational view of a decision tree based merge algorithm being applied in accordance with one embodiment.
Figure 20:
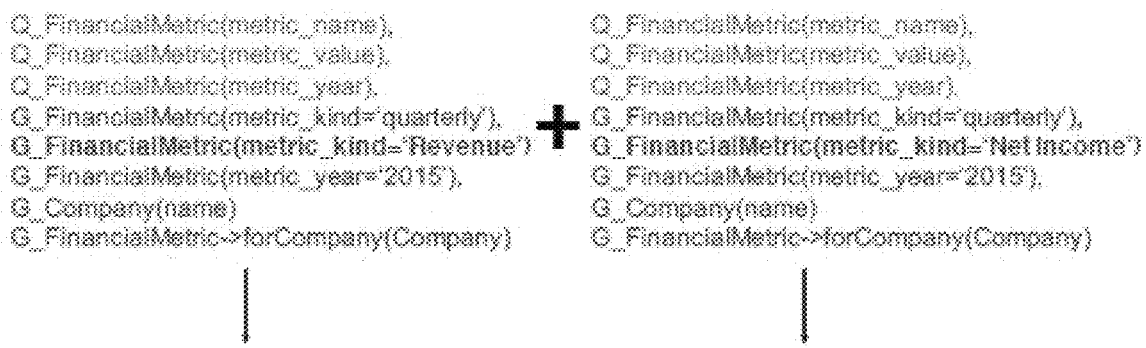
FIG. 20 is a representational view of a decision tree based merge algorithm being applied in accordance with one embodiment.

Looking to FIGS. 19 and 20, two examples of how a decision tree based merge algorithm may compare and/or merge two maximal patterns. Referring specifically to the example shown in FIG. 19, the decision tree based merge algorithm decides to merge the two maximal patterns together and results in a single pattern. Alternatively, FIG. 20 shows an example where the merge algorithm results in two separate patterns. Again, if the algorithm is unable to merge $p_{new}$ with any $p_x$∈$MS_{MP}$, then $p_{new}$ will preferably be added as a new pattern to $MS_{MP}$.

Once the frequent patterns clustered around each key concept have been structurally merged according to any of the approaches described above, the merged frequent patterns may be used to identify a structural footprint of the rich entity, as mentioned above in sub-process 1604 of FIG. 16.

The composition of rich entities may internally be a process which includes adding the SELECT (projection) terms involving the key concept in the rich entity in all the merged maximal patterns, as the direct first level data properties of the rich entity RE. The process may further include adding all other complex patterns as additional complex data properties of the key concept using expressions, a mechanism used for exposing pre-materialized information. These complex patterns include joins with other concepts and/or specific predicates. Moreover, each such pattern may be converted to an OQL query (expression) which is preferably evaluated in order to obtain the queried terms in the expression. These queried terms may in turn inform the rich entity.

Looking to FIG. 21A, an example of the structural composition of a rich entity "CompanyRE" presented in JSON format. Moreover, FIG. 21B illustrates a graphical representation of the rich entity of FIG. 21A. As shown, CompanyRE has been structurally composed around the key concept Company and has a few direct data properties such as name and stock symbol. These direct properties have been extracted from the projection terms involving the key concept Company in the merged patterns. The other properties are more complex and have been realized from the evaluation of expressions obtained from the complex merged patterns. These include CEO Compensation, Revenue and Net_Income.

EXAMPLES

As previously mentioned, once OQL terms are extracted from each of the queries of a defined workload, the terms may be converted into strings, e.g., so that each query may be represented as a set of strings. For purposes of string representation according to the present example, the queried terms are tagged using the notation "Q_" as a prefix, while each extracted Context Term is tagged using the notation "C_" as a prefix. The string representation of the queried terms may be summarized as follows, where ":" is intended to represent concatenation.

Prefix(Q_):Concept(Attribute) and

Prefix(Q_):Concept(AggFn(Attribute)) for aggregations

The string representation of context terms is as follows:

Prefix(C_):Concept(Attribute: Predicate_Type:Value(s)) for Predicates and

Prefix(C_):Concept_1->Object_Property (Concept_2) for Join conditions.

Looking to the following two examples (Example 1 and Example 2), the term extraction for an OQL query are shown with and without aggregations, respectively.

Example 1: OQL Query without Aggregation

```
SELECT      oFinancialMetric.metric_name,
            oFinancialMetric.metric_value,
            oFinancialMetric.metric_year
FROM        FinancialMetric oFinancialMetric, Company oCompany
WHERE       oFinancialMetric.metric_kind='quarterly' AND
            oCompany.name,'IBM' AND
            oFinancialMetric.metric_year ='2015' AND
            oFinancialMetric.metric_name = 'Revenue' AND
            oFinancialMetric->forCompany=oCompany
```

This query may be broken down into the following OQL terms:

```
Queried Terms (Projection terms)
    Q_FinancialMetric(metric_name),
    Q_FinancialMetric(metric_value),
    Q_FinancialMetric(metric_year)
Context Terms (Predicates)
    C_FinancialMetric(metric_kind='quarterly'),
    C_FinancialMetric(metric_year='2015'),
    C_Company(name),
    C_FinancialMetric(metric_name,'Revenue')
Context Terms (Join Conditions)
    C_FinancialMetric->forCompany(Company)
```

Example 2: OQL Query with Aggregation

```
SELECT      SUM(oFinancialMetric.metric_value),
            oFinancialMetric.metric_year
FROM        FinancialMetric oFinancialMetric, Company oCompany
WHERE       oFinancialMetric.metric_kind='yearly' AND
            oCompany.name='IBM' AND
            oFinancialMetric.metric_name = 'Revenue' AND
            oFinancialMetric->forCompany=oCompany
GROUP BY    oFinancialMetric.metric_year
```

This query may be broken down into the following OQL terms:

```
Queried Terms (Projection terms)
    Q_FinancialMetric(sum(metric_value)),
    Q_FinancialMetric(metric_year)
Context Terms (Predicates)
    C_FinancialMetric(metric_kind='yearly'),
    C_Company(name),
    C_FinancialMetric(metric_name,'Revenue')
Context Terms (Join Conditions)
    C_FinancialMetric->forCompany(Company)
```

Many queries in the workload include predicates on attributes (e.g., such as "name", "id", etc.) of the concepts involved in the query. Some of these attributes have a high cardinality e.g. 'Company.name', leading to many patterns with each pattern having a different predicate value. If these predicate values are included in the OQL terms, then it is less likely that these patterns would show up as frequent patterns because of low support. To obviate this problem, the cardinality of all predicated attributes are checked against the database storing the knowledge graph and values are included only for low cardinality predicates such as 'metric_name="Revenue"'. These low cardinality attributes have a much higher chance of showing up as frequent patterns as they would be repeated many times across different queries.

Example 3

Consider the following example where three frequent patterns are output from an FP Mining algorithm. Each of these three patterns has a support $S>\tau$. Moreover, it is determined that the third frequent pattern is a maximal pattern. This maximal pattern is more complete in terms of projection items and context. However, as illustrated in this example, it might have a lower support than the other two frequent patterns. Thus, despite the fact that the maximal pattern may have a lower support than the other frequent patterns, it provides more context and information about the queried terms, has a support $S>\tau$ and thus is better suited for informing rich entities.

```
Frequent pattern 1: Support = 0.3
    Q_FinancialMetric(metric_name),
    Q_FinancialMetric(metric_year),
    C_FinancialMetric (metric_year='2015 '),
    C_Company(name)
Frequent pattern 2: Support = 0.23
    Q_FinancialMetric(metric_name),
    Q_FinancialMetric(metric_value),
    C_Company(name)
    C_FinancialMetric->forCompany(Company)
Frequent pattern 3 (Maximal pattern): Support = 0.18
    Q_FinancialMetric(metric_name),
    Q_FinancialMetric(metric_value),
    Q_FinancialMetric(metric_year),
    C_FinancialMetric(metric_kind='quarterly'),
    C_FinancialMetric(metric_year='2015'),
    C_FinancialMetric(metric_name='Revenue'),
    C_Company(name)
    C_FinancialMetric->forCompany(Company)
```

Example 4

Formally, a rich entity RE(kc, P', CP) associated with a key concept kc E C for a given domain described by an Ontology O(C, R, P), may be defined as a grouping of Direct Data Properties and Complex Properties (or Expressions). Direct Data Properties are a set of simple (or direct) data properties P'∈P where each direct property p'∈P' is a data property that is directly attached to kc in O. Complex Properties (or Expressions) $CP=\{E_1, E_2, \ldots, E_k\}$ is a set of one or more expressions. Each Expression $E_i$ captures more complex navigational patterns, nested structures and computations that are to be associated with kc, such as concepts and properties in the immediate neighborhood of kc or that involve a multi-hop navigation or that may be computed from existing data properties spread over different concepts. An Expression E may be defined as a struct given below:

```
struct {
    Expression NEx; <optional>
    property_name pname ;
    OQL_query q;
    Direct_properties P"
} Expression;
```

Moreover, the composition of Expression E may be defined as follows. "NE" represents an expression and may have zero or more nested expressions to allow arbitrary nesting in a complex property. "pname" represents the name for the complex property. An "OQL query q" describes the footprint of the complex property (or expression) associated with the key concept, in terms of a subgraph over the base ontology. The subgraph includes the concepts, properties and relations involved in materializing this expression as a data instance. Moreover, 'P'' represents the set of direct data properties that would be materialized using the expression and associated with the complex property. P'' may include existing data properties of concepts involved in the expression or some new values or aggregations computed by the expression using q.

Figure 22B:
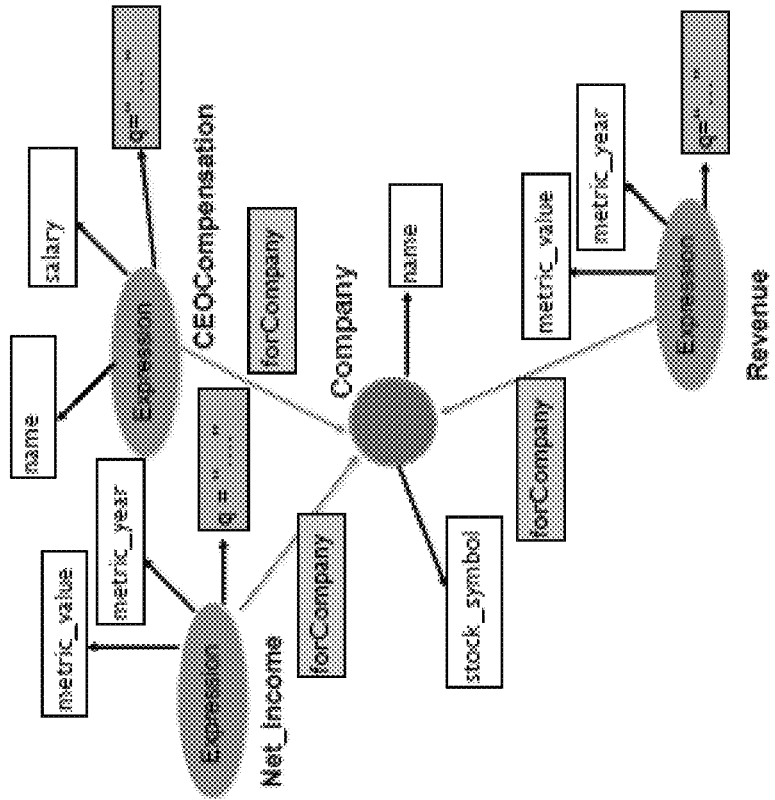
FIG. 22B is a representational view of the structural composition of a rich entity in accordance with one embodiment.
Figure 22A:
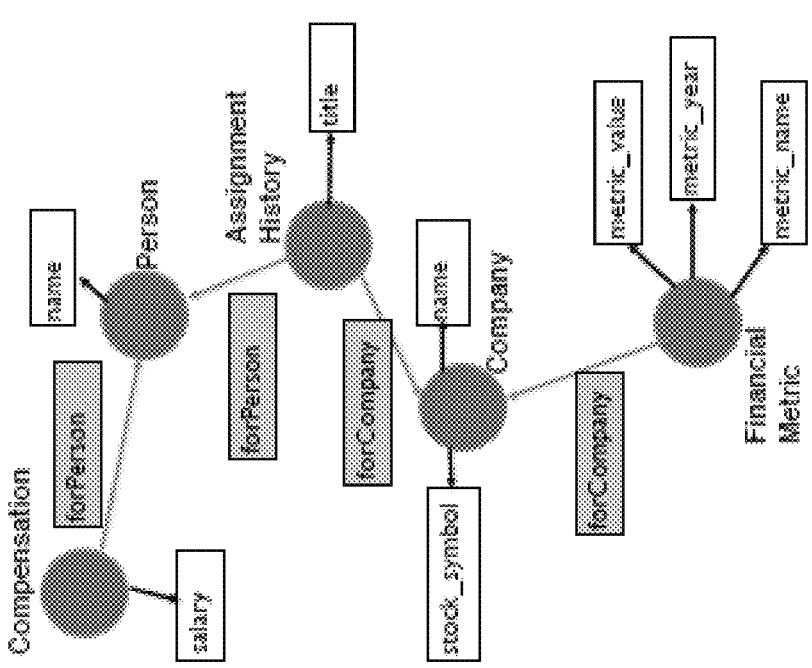
FIG. 22A is a representational view of a base ontology in accordance with one embodiment.

FIGS. 22A-22B show an example company rich entity. FIG. 22A shows a snapshot of a base financial ontology containing a set of concepts, properties and relationships. FIG. 22B provides a structural view of the company rich entity that has been defined as an overlay on the base financial ontology. The key concept here is Company. It has two direct properties name and stock_symbol and has three complex properties that are represented as expressions. These expressions are shown as separate concepts connected to the key concept Company with object properties called 'forCompany'.

The complex properties include CEOCompensation which includes name and salary as two data properties; Revenue which includes metric_value and metric_year as two data properties; and Net_Income which includes metric_value and metric_year as two data properties. Each of these expressions is associated with an OQL query q which describes how to materialize the properties associated with the expression.

The OQL query q is provided below for each of the following expressions.

Revenue:

| SELECT | fm.metric_value as metric_value, |
| | fm.metric_year as metric_year |
| FROM | Company c, FinancialMetric fm |
| WHERE | fm.metric_name = 'Revenue' |
| | AND  fm.metric_year = '2015' |
| | AND  fm->forCompany = c |

Net_Income:

| SELECT | fm.metric_value as metric_value, |
| | m.metric_year as metric_year |
| FROM | Company c, FinancialMetric fm |
| WHERE | fm.metric_name = 'Net_Income' |
| | AND  fm.metric_year = '2015' |
| | AND  fm->forCompany = c |

CEOCompensation:

| SELECT | p.name as name, cp.salary as salary |
| FROM | Company c, AssignmentHistory ah, |
| | Person p, Compensation cp |
| WHERE | ah.title='CEO' |
| | AND  ah->forCompany = c |
| | AND  ah->forPerson = p |
| | AND  cp->forPerson = p |

Figure 23:
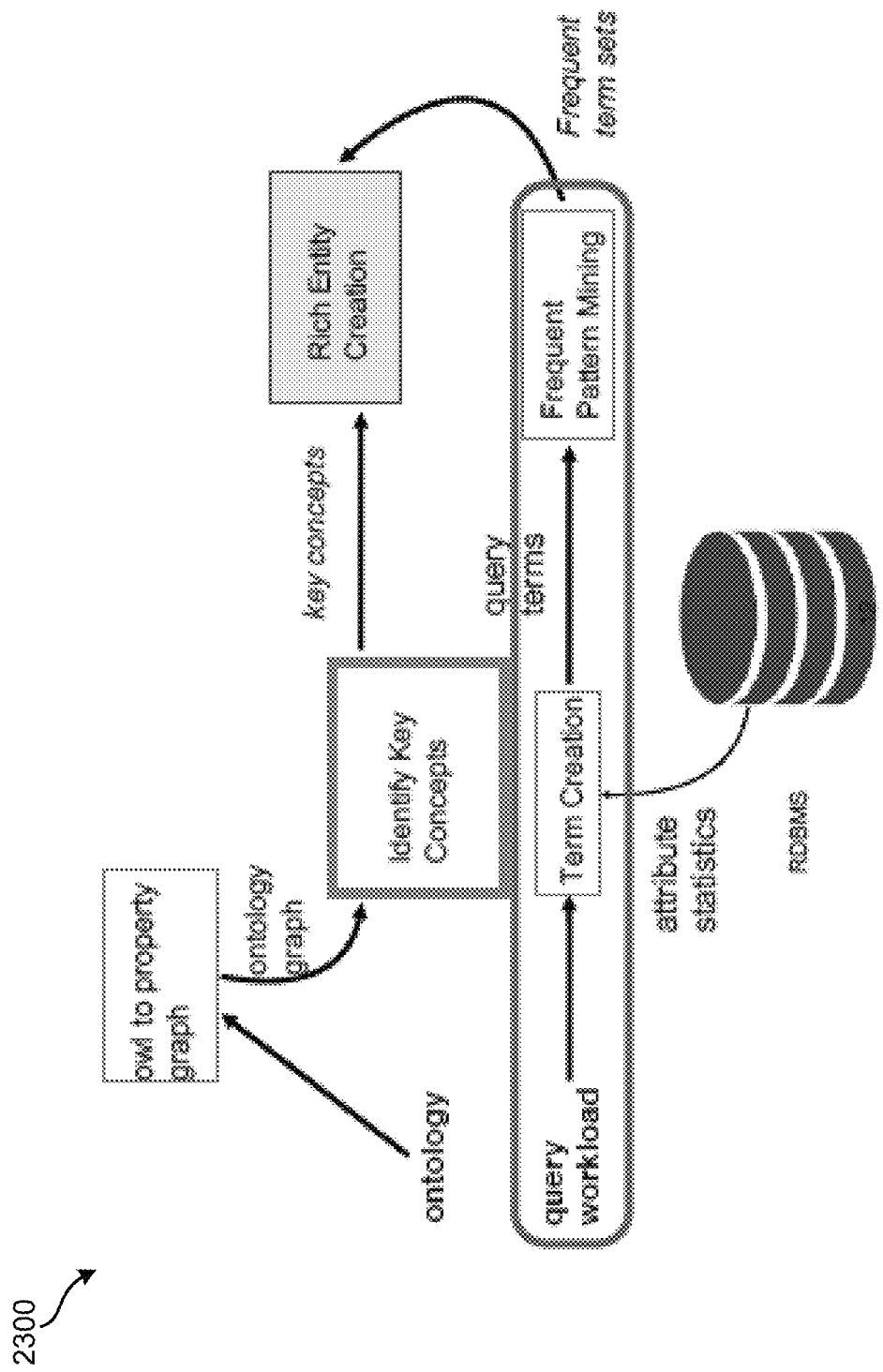
FIG. 23 is a high level representational view of a system in accordance with one embodiment.

Referring now to FIG. 23, the system architecture that developed to automatically identify and create rich entities using key concepts and/or the maximal patterns, e.g., as described above. Accordingly, any of the embodiments described herein may be implemented in combination with a system architecture which is preferably able to automatically detect and create rich entities using inputs from the domain ontology and/or the user query workload. FIG. 23 shows a system 2300 having an architecture which may serve as a complete end-to-end Rich Entity Creation (RECON) system.

The system 2300 takes a domain ontology (which may be described in an OWL2 format) as an input, and extracts the structural information contained in the ontology in the form of a property graph. The system 2300 may then use novel algorithms for centrality analysis and statistical separation over the property graph, to identify key concepts around which rich entities may be formed.

The system 2300 may also take the query workload represented as a set of OQL queries expressed over the ontology as input. The system 2300 may parse each OQL query in the workload and breaks the query into a set of OQL terms. Each OQL term may include concepts, data properties that the user is interested in or predicates over and relations between concepts in the ontology over which the query has been defined. While creating such terms the system 2300 may also take some statistical inputs about the value distribution of the involved data properties. These inputs may be obtained from the underlying storage system that stores the integrated data. The item sets in a transaction may be similar to the terms in OQL statements. The items sets in each OQL query in the query workload may then be fed to a frequent pattern mining algorithm which outputs a set of frequent patterns observed from the query workload, e.g., according to any of the approaches described herein.

The output of the frequent pattern mining module (the frequent patterns as well as the key concepts identified using centrality analysis over the domain ontology) may subsequently be fed to the rich entity creation module. The module may use several novel algorithms and techniques to combine both pieces of information to identify and create rich entities, e.g., according to any of the embodiments described herein.

Once a rich entity is created, the information included therein may be used to respond to a query received, e.g., from a user. For instance, if a query regarding a key concept of a rich entity is received, all the information in the rich entity associated with that key concept may be returned in response to the received query. As described above, this desirably allows a data storage system to return an appropriate amount of relevant information in addition to that which was specifically requested, thereby serving as a significant improvement over the limitations of conventional knowledge bases.

It follows that various embodiments included herein include several novel techniques and/or algorithms which may be able to automatically detect, learn, and/or create domain specific rich entities. Query patterns in the query logs may be exploited, and the structure/relationships between entities defined for a particular domain in its domain ontology may be leveraged. Some of the embodiments described herein also address challenges in extracting and meaningfully combining such information to learn and compose rich entities. More specifically, novel implementations of performing centrality analysis and statistical separation to identify key concepts for rich entities, novel techniques for term creation for frequent pattern mining, novel algorithms for rich entity learning and creation using frequent patterns in the workload and the key concepts extracted from an ontology, as well as a complete end-to-end system RECON for automatic learning and creation of rich entities are introduced herein.

By implementing data storage systems which are able to detect, learn and create rich entities, an enhanced user experience is achieved and the aforementioned conventional shortcomings regarding relevant data exploration are ameliorated. Moreover, various techniques described herein may be effective in detecting and creating domain specific rich entities and may be applied to a wide variety of application domains, thus adding great value to data exploration and information extraction from entity-centric real-world knowledge bases.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product comprising a computer readable storage medium having program instructions embodied therewith, the program instructions executable by a processor to cause the processor to:
   in response to receiving a query, identify, by the processor, key concepts in a domain ontology, wherein identifying the key concepts includes: performing centrality analysis of concepts extracted from the domain ontology by:
      removing subclass relationships from an ontology graph,
      computing page rank values for concepts in the ontology graph, and
      re-attaching the subclass relationships to each of the concepts in the ontology graph;
   define, by the processor, a workload as a set of queries, wherein the workload is defined as a set of Ontology Query Language (OQL) queries;
   extract, by the processor, terms from each of the queries;
   detect, by the processor, frequent patterns across the set of queries;
   identify, by the processor, maximal patterns from the frequent patterns detected; and
   increasing use, by the processor, the efficiency by which the query is satisfied by using the key concepts and the maximal patterns to create a rich entity.

2. The computer program product of claim 1, wherein performing the centrality analysis of concepts extracted from the domain ontology includes:
   updating the page rank values for the concepts in the ontology graph by performing a depth first traversal over the subclass relationships,
   wherein the depth first traversal identifies an ancestor having a highest page rank value.

3. The computer program product of claim 1, wherein performing the centrality analysis handles unions and complex classes of the domain ontology.

4. The computer program product of claim 1, wherein performing the centrality analysis includes introducing a reverse edge to each edge flowing between concepts in the domain ontology.

5. The computer program product of claim 1, wherein identifying the key concepts includes performing statistical separation of the concepts in the ontology graph based on the page rank value assigned thereto, wherein performing the statistical separation includes using a first derivative of the page rank values.

6. The computer program product of claim 5, wherein creating the rich entity includes:
   clustering the maximal frequent patterns around each of the identified key concepts; and
   determining a structural composition of the rich entity,
   wherein determining the structural composition of the rich entity includes structurally merging the frequent patterns clustered around each key concept,
   wherein determining the structural composition of the rich entity includes using the merged frequent patterns to identify a structural footprint of the rich entity.

7. The computer program product of claim 1, wherein performing the centrality analysis includes:
   using an Ontology Page Rank Algorithm to compute the page rank value for each concept in the ontology graph;
   wherein identifying the key concepts includes performing statistical separation of the concepts in the ontology graph based on the page rank value assigned thereto,
   wherein performing the statistical separation includes:
   computing a difference vector, wherein the difference vector includes values that represent differences between adjacent pairs of page rank values;
   computing a mean and standard deviation of the difference vector; and
   determining a first pair of page rank values that are separated by an amount that is greater than a predetermined value by iterating over the page rank values in descending order.

8. A computer program product comprising a computer readable storage medium having program instructions embodied therewith, the program instructions executable by a hardware processor to cause the hardware processor to:
   define, by the hardware processor, a workload as a set of queries, wherein the workload is defined as a set of Ontology Query Language (OQL) queries;
   extract, by the hardware processor, terms from each of the queries;
   detect, by the hardware processor, frequent patterns across the set of queries;
   identify, by the hardware processor, maximal patterns from the frequent patterns detected; and
   use, by the hardware processor, the maximal patterns to create a rich entity wherein using the maximal patterns to create a rich entity includes:
   identifying key concepts from information embedded in the frequent patterns, and
   determining which of the maximal patterns correspond to each of the key concepts.

9. The computer program product of claim 8, wherein the extracted terms are queried terms.

10. The computer program product of claim 8, wherein the extracted terms are context terms.

11. The computer program product of claim 10, wherein the extracted terms are predicate context terms.

12. The computer program product of claim 10, wherein the extracted terms are join condition context terms.

13. The computer program product of claim 10, wherein the extracted terms are nested query context terms.

14. The computer program product of claim 8,
wherein identifying maximal patterns from the frequent patterns detected includes:
sorting the frequent patterns by a respective size of the frequent patterns in descending order;
initializing a set of maximal patterns with one of the frequent patterns having a largest size;
determining whether each of the remaining frequent patterns are incorporated in the set of maximal patterns;
in response to determining a given one of the remaining frequent patterns is incorporated in the set of maximal patterns, discarding the given one of the remaining frequent patterns; and
in response to determining a given one of the remaining frequent patterns is not incorporated in the set of maximal patterns, adding the given one of the remaining frequent patterns to the set of maximal patterns.

15. A computer-implemented method, comprising:
in response to receiving a query, identifying key concepts in a domain ontology, wherein identifying the key concepts includes performing centrality analysis of concepts extracted from the domain ontology;
defining a workload as a set of queries, wherein the workload is defined as a set of Ontology Query Language (OQL) queries;
extracting terms from each of the queries;
detecting frequent patterns across the set of queries;
identifying maximal patterns from the frequent patterns detected; and
increasing the efficiency by which the query is satisfied by using the key concepts and the maximal patterns to create a rich entity,
wherein creating the rich entity includes:
clustering the maximal frequent patterns around each of the identified key concepts, and
determining a structural composition of the rich entity.

16. The computer-implemented method of claim 15, comprising:
receiving a query; and
in response to receiving the query, identifying the key concepts in the domain ontology,
wherein using the key concepts and the maximal patterns to create the rich entity increases the efficiency by which the query is satisfied.

17. The computer-implemented method of claim 16, wherein clustering the identified maximal frequent patterns around each of the identified key concepts includes:
identifying a concept from each of the maximal patterns, the concept having a highest support for the respective maximal pattern; and
clustering each of the maximal patterns around the corresponding concept.

18. The computer-implemented method of claim 16, wherein clustering the identified maximal frequent patterns around each of the identified key concepts includes:
identifying a concept from each of the maximal patterns, the concept having a highest page rank score for the respective maximal pattern; and
clustering each of the maximal patterns around the corresponding concept.

19. The computer-implemented method of claim 16, wherein clustering the identified maximal frequent patterns around each of the identified key concepts includes:
detecting concepts which have been identified as key concepts in each of the maximal patterns; and
clustering each of the maximal patterns around each of the corresponding detected concepts.

20. The computer-implemented method of claim 16, wherein determining the structural composition of the rich entity includes structurally merging the frequent patterns clustered around each key concept.

21. The computer-implemented method of claim 15, wherein determining a structural composition of the rich entity includes using the merged frequent patterns to identify a structural footprint of the rich entity, wherein determining the structural composition of the rich entity includes structurally merging the frequent patterns clustered around each key concept,
wherein performing the centrality analysis includes:
using an Ontology Page Rank Algorithm to determine an ontology page rank value for each concept in an ontology graph; and
assigning the ontology page rank values to the respective concepts in the ontology graph,
wherein identifying the key concepts includes performing statistical separation of the concepts based on the page rank value assigned thereto,
wherein performing the statistical separation includes selecting each of the concepts having a page rank value that is greater than a predetermined value,
wherein using the Ontology Page Rank Algorithm to determine an ontology page rank value for each concept in an ontology graph includes:
duplicating edges corresponding to the concepts in the ontology graph;
changing source and destination nodes for each of the duplicate edges;
removing union concepts associated with the ontology graph;
removing inheritance edges associated with the ontology graph; and
adding a reverse edge for each remaining edge in the ontology graph.

22. The computer-implemented method of claim 21, wherein the set of OQL queries have been issued against the ontology graph, wherein each OQL query is split into a set of OQL terms, wherein the OQL terms are selected from the group of OQL clauses consisting of: SELECT, FROM, WHERE and GROUP BY.

23. A system, comprising:
a processor; and
logic integrated with the processor, executable by the processor, or integrated with and executable by the processor, the logic being configured to perform the computer-implemented method of claim 15.

* * * * *